US012706650B2

(12) United States Patent
Wang et al.

(10) Patent No.: US 12,706,650 B2
(45) Date of Patent: Aug. 11, 2026

(54) CSI REPORT WITH TIME DOMAIN CHANNEL INFORMATION

(71) Applicant: QUALCOMM Incorporated, San Diego, CA (US)

(72) Inventors: Runxin Wang, San Diego, CA (US); Yu Zhang, San Diego, CA (US); Muhammad Sayed Khairy Abdelghaffar, San Jose, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 18/571,898

(22) PCT Filed: Aug. 30, 2021

(86) PCT No.: PCT/CN2021/115277

§ 371 (c)(1),
(2) Date: Dec. 19, 2023

(87) PCT Pub. No.: WO2023/028742

PCT Pub. Date: Mar. 9, 2023

(65) Prior Publication Data

US 2024/0291537 A1 Aug. 29, 2024

(51) Int. Cl.
*H04B 7/06* (2006.01)
*H04W 24/10* (2009.01)

(52) U.S. Cl.
CPC ......... *H04B 7/0626* (2013.01); *H04B 7/0645* (2013.01); *H04W 24/10* (2013.01)

(58) Field of Classification Search
CPC .... H04W 24/08; H04W 24/10; H04B 7/0663; H04B 7/0641; H04B 7/0626;

(Continued)

(56) References Cited

U.S. PATENT DOCUMENTS

| | | | |
|---|---|---|---|
| 10,756,791 | B2 | 8/2020 | Sengupta et al. |
| 2013/0201912 | A1 | 8/2013 | Sheng et al. |

(Continued)

FOREIGN PATENT DOCUMENTS

| | | | |
|---|---|---|---|
| CN | 110249574 | A | 9/2019 |
| CN | 110474661 | A | 11/2019 |
| WO | 2019246135 | | 12/2019 |

OTHER PUBLICATIONS

Supplementary European Search Report—EP21955324—Search Authority—Munich—Mar. 24, 2025.

(Continued)

*Primary Examiner* — Peter Chen
(74) *Attorney, Agent, or Firm* — Loza & Loza LLP

(57) ABSTRACT

Aspects of the disclosure relate to transmission of a single CSI report that includes time domain channel information obtained from a plurality of CSI-RSs received by a UE over time. For example, each of the CSI-RSs may be associated with a different respective time resource (e.g., each CSI-RS is received at a different respective time). The UE may obtain a plurality of CSI values based on the plurality of CSI-RSs and generate the time domain channel information from the plurality of CSI values. In some examples, the time domain channel information includes the plurality of CSI values. In other examples, the time domain channel information includes compressed channel information based on the plurality of CSI values. A base station may then utilize the time domain channel information included in the CSI report for scheduling downlink data transmissions to the UE.

17 Claims, 22 Drawing Sheets

(58) Field of Classification Search
CPC .... H04B 7/0645; H04B 7/065; H04B 7/0456; H04B 7/06958
See application file for complete search history.

(56) References Cited

U.S. PATENT DOCUMENTS

| | | | | |
|---|---|---|---|---|
| 2020/0145071 | A1* | 5/2020 | Brown | H04B 7/0634 |
| 2020/0228232 | A1* | 7/2020 | Lyashev | G06T 7/0012 |
| 2021/0076243 | A1 | 3/2021 | Manolakos | |
| 2021/0195632 | A1 | 6/2021 | Jungnickel et al. | |
| 2021/0409991 | A1* | 12/2021 | Park | H04L 5/0048 |

OTHER PUBLICATIONS

Ericsson: "On Dynamic Signalling for Aperiodic and Semi-Persistent CSI-RS", 3GPP Draft, 3GPP TSG-RAN WG1 #87ah-NR, R1-1700761, Spokane, WA, USA, Jan. 16-20, 2017, pp. 1-4.
International Search Report and Written Opinion—PCT/CN2021/115277—ISA/EPO—Mar. 28, 2022.

* cited by examiner

FIG. 19

CSI REPORT WITH TIME DOMAIN CHANNEL INFORMATION

CROSS-REFERENCE TO RELATED APPLICATION(S)

This application is the U.S. national stage of PCT patent application number PCT/CN2021/115277 filed on Aug. 30, 2021.

TECHNICAL FIELD

The technology discussed below relates generally to wireless communication networks, and more particularly, to CSI reports including time domain channel information representative of the channel over time.

BACKGROUND

In wireless communication systems, such as those specified under standards for 5G New Radio (NR), an access point (e.g., a base station) may communicate with a user equipment (UE) (e.g., a smartphone) utilizing a modulation and coding scheme (MCS), rank, and precoding matrix. The MCS, rank, and precoding matrix may be selected based on an estimate of the channel between the base station and the UE. To assist the UE in estimating the channel, the base station may transmit one or more reference signals, such as channel state information reference signals (CSI-RS), to the UE.

After channel estimation, the UE may return a channel state information (CSI) report indicating the quality of the channel to the base station. The CSI report may include, for example, a channel quality indicator (CQI) that indicates to the base station an MCS to use for transmissions to the UE, a rank indicator (RI) that indicates to the base station the number of layers to use for transmissions to the UE, a precoding matrix indicator (PMI) that indicates to the base station the precoding matrix to use for transmissions to the UE, and other suitable parameters.

The base station (e.g., gNodeB (gNB)) can configure the UE with one or more CSI report settings. Each CSI report setting may indicate, for example, the CSI related parameters to be reported (e.g., one or more of the CQI, PMI, RI, etc.), the time-domain behavior of CSI reports (e.g., periodic, semi-persistent, or aperiodic), the frequency granularity for reporting the CQI and PMI (e.g., wideband or sub-band), codebook configuration, and other suitable parameters. Each CSI report setting may further be associated with a respective CSI-RS resource setting that specifies the resource elements (REs) on which CSI-RSs may be transmitted, along with a set of ports at the gNB from which the CSI-RSs may be transmitted.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication includes a transceiver, a memory, and a processor coupled to the wireless transceiver and the memory. The processor and the memory are configured to receive a plurality of reference signals, each associated with a different time resource of a plurality of time resources, and transmit a channel state information (CSI) report including time domain channel information based on a plurality of CSI values obtained based on the plurality of reference signals.

Another example provides a base station configured for wireless communication includes a transceiver, a memory, and a processor coupled to the wireless transceiver and the memory. The processor and the memory are configured to transmit a plurality of reference signals to a user equipment (UE), each of the plurality of reference signals being associated with a different time resource of a plurality of time resources, and receive a channel state information (CSI) report from the UE. The CSI report includes time domain channel information based on a plurality of CSI values obtained based on the plurality of reference signals.

Another example provides a method for wireless communication at a user equipment (UE). The method includes receiving a plurality of reference signals, each associated with a different time resource of a plurality of time resources, and transmitting a channel state information (CSI) report including time domain channel information based on a plurality of CSI values obtained based on the plurality of reference signals.

Another example provides a method for wireless communication at a base station. The method includes transmitting a plurality of reference signals to a user equipment (UE), each of the plurality of reference signals being associated with a different time resource of a plurality of time resources, and receiving a channel state information (CSI) report from the UE. The CSI report includes time domain channel information based on a plurality of CSI values obtained based on the plurality of reference signals.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments, such exemplary embodiments can be implemented in various devices, systems, and methods.

BRIEF DESCRIPTION OF THE DRAWINGS

FIG. 19 is a flow chart of another exemplary method for transmitting time domain channel information within a CSI report according to some aspects.

DETAILED DESCRIPTION

Figure 1:
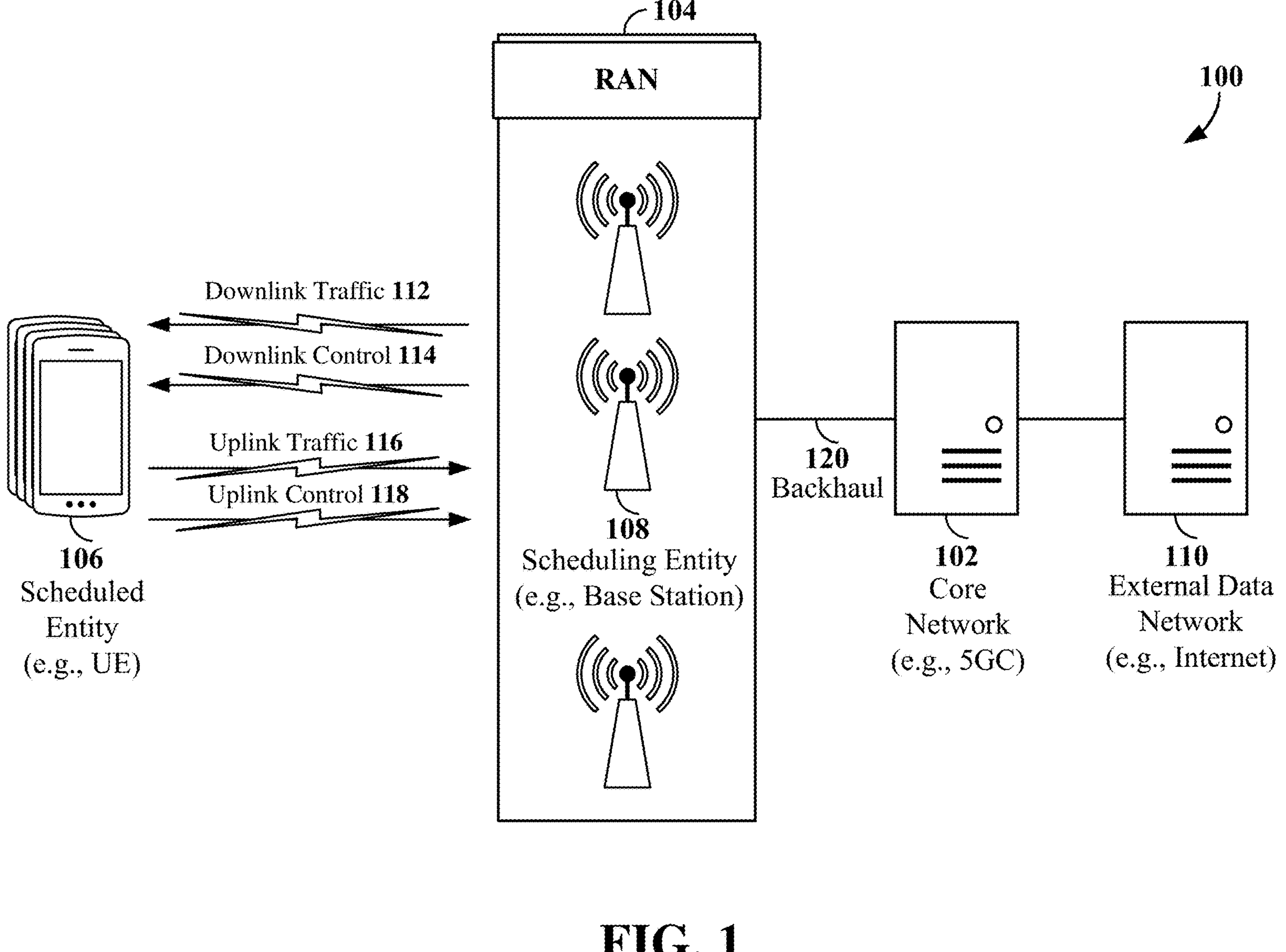
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements, end-user devices, etc. of varying sizes, shapes and constitution.

Various aspects of the disclosure relate to a UE configured to transmit a single CSI report that includes time domain channel information obtained from a plurality of CSI-RSs received by the UE over time. For example, each of the CSI-RSs may be associated with a different respective time resource (e.g., each CSI-RS is received at a different respective time). The UE may obtain a plurality of CSI values based on the plurality of CSI-RSs. The CSI values may include, for example, a respective set of CSI values for each of a plurality of CSI types. The CSI types may include, for example, a channel state information reference signal (CSI-RS) resource indicator (CRI), a rank indicator, a layer indicator (LI), a precoding matrix indicator (PMI), and a channel quality indicator (CQI). In some examples, the time domain channel information is arranged in the CSI report in an order corresponding to the CRI, the RI, the LI, zero padding, the PMI, and the CQI. The base station may then utilize the time domain channel information included in the CSI report to predict the channel for DL data transmissions to the UE. For example, the base station may select one or more of a rank, precoding matrix, or MCS for scheduling of at least one downlink data transmission to the UE based on the time domain channel information.

In some examples, the time domain channel information in the CSI report may include the plurality of CSI values. In some examples, the time domain channel information includes compressed channel information based on the plurality of CSI values. In some examples, the compressed channel information may include quantized time domain coefficients obtained using a time domain transform of the plurality of CSI values. In some examples, the compressed channel information may further include additional quantized coefficients obtained using at least one of a spatial domain transform or a frequency domain transform in addition to the time domain transform. In some examples, the time domain transform may be applied per sub-band. In this example, different time domain transforms (e.g., discrete Fourier transform (DFT), discrete cosine transform, etc.) may be applied to different sub-bands.

In some examples, the compressed channel information may include a long-term amplitude parameter representative of the amplitude of a number of CSI values including the plurality of CSI values and additional CSI values obtained prior to the plurality of CSI values. In this example, the compressed channel information may further include short-term phase coefficients based on the plurality of CSI values. For example, the short-term phase coefficients may include a main quantized phase coefficient and a plurality of differential quantized phase coefficients that are differential with respect to the main quantized phase coefficient. In some examples, the main quantized phase coefficient may be quantized using a first quantization type (e.g., Q1 quantization), while the differential quantized phase coefficients may be quantized using a second quantization type (e.g., Q2 quantization).

In some examples, the compressed channel information may include at least one long-term distribution parameter obtained by applying a distribution function to long-term amplitude coefficients representative of the amplitude of the number of CSI values over time. In this example, the compressed channel information may further include short-term coefficients, including a plurality of quantized amplitude coefficients and a plurality of quantized phase coefficients. The plurality of quantized amplitude coefficients may be quantized based on the at least one long-term distribution parameter. The plurality of quantized phase coefficients may include a first quantized phase coefficient and a plurality of quantized differential phase coefficients that are differential with respect to the first quantized phase coefficient.

In some examples, the at least one long-term distribution parameter may be obtained based on a plurality of sets of CSI values, each associated with a respective reference signal from a set of reference signals including the plurality of reference signals and additional reference signals received prior to the plurality of reference signals. For example, respective sets of coefficients may be obtained by applying a respective transform to each set of CSI values. The sets of coefficients may then be sorted into groups of coefficients, each including corresponding coefficients across the set of reference signals that are corresponding in one of a frequency domain or a time domain. Here, the at least one long-term distribution parameter may include a respective at least one long-term distribution parameter for each of the groups of coefficients.

In addition, a plurality of sub-groups of coefficients may be identified from the groups of coefficients. Each sub-group of coefficients may be associated with the plurality of reference signals. In this example, a respective set of short-term quantized amplitude coefficients and quantized phase coefficients (e.g., first phase coefficients and quantized differential phase coefficients) may be determined for each sub-group of coefficients.

In some examples, the compressed channel information further includes at least one long-term differential distribution parameter for each of the groups of coefficients. Each of the at least one long-term differential distribution parameter may be obtained by applying an additional distribution function to respective long-term differential coefficients determined for each of the groups of coefficients. In this example, the plurality of short-term quantized amplitude coefficients for each of the sub-groups of coefficients may include a respective first quantized amplitude coefficient quantized based on the at least one long-term distribution parameter, and a plurality of quantized differential amplitude coefficients quantized based on the at least one long-term differential distribution parameter.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
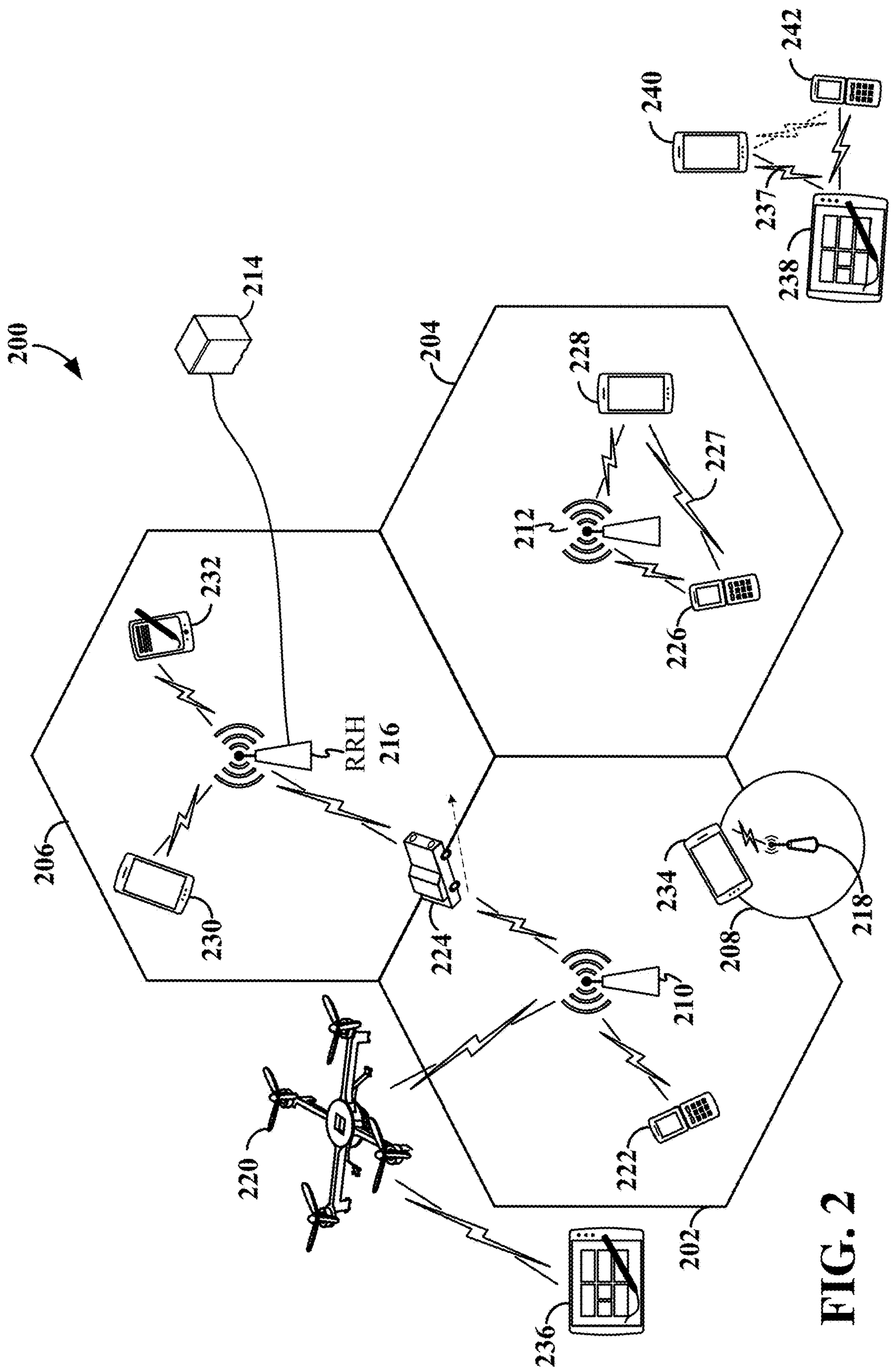
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
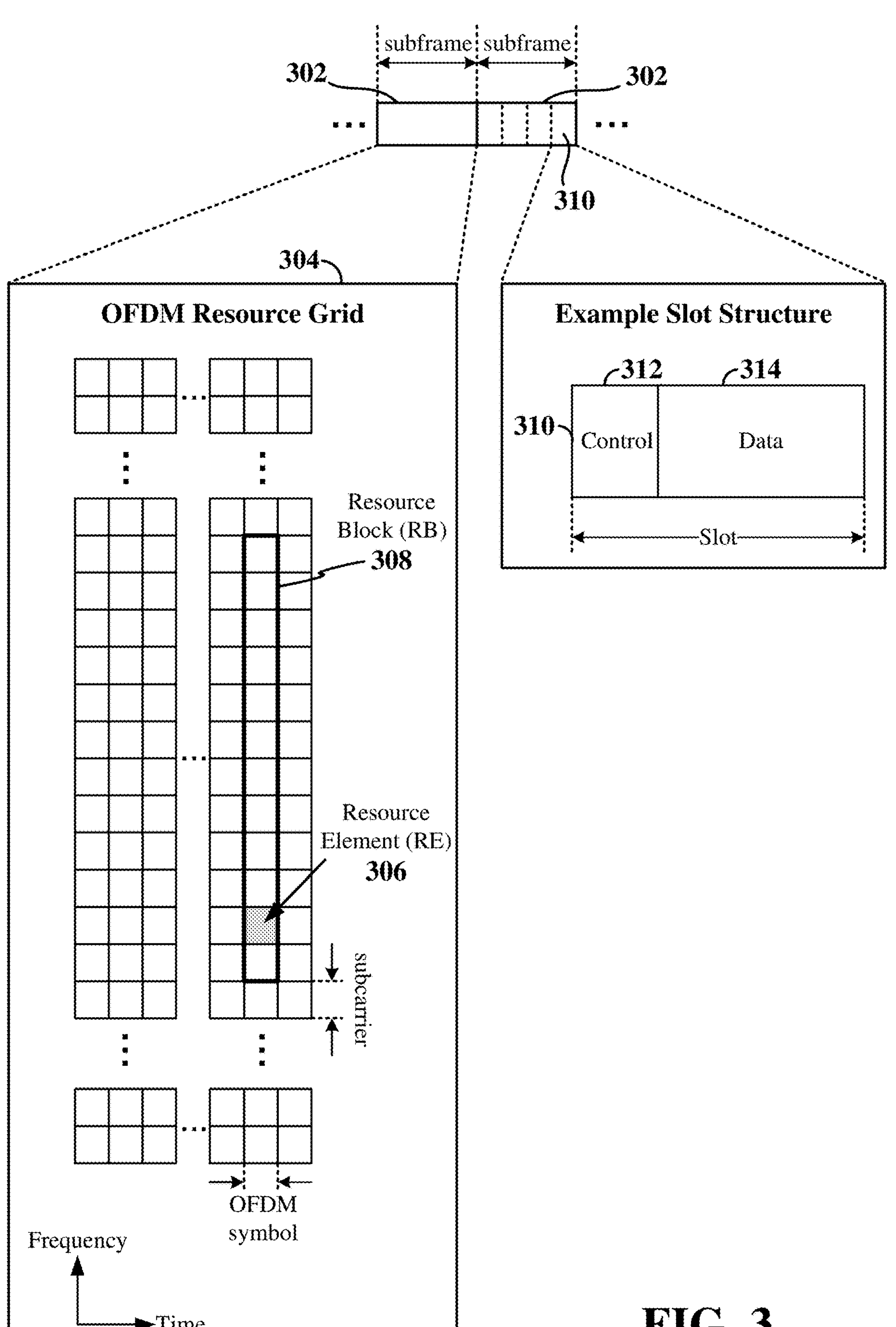
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
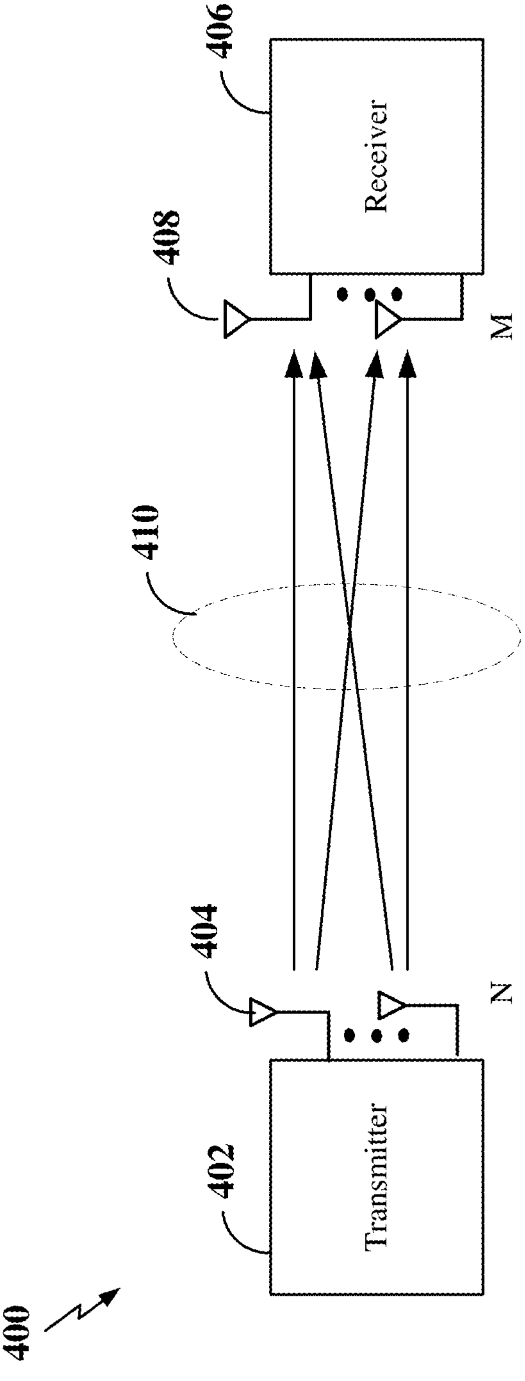
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

Figure 5:
FIG. 5 is a diagram illustrating communication using beamformed signals according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams **506*a*-506*h*, each associated with a different spatial direction. In addition, the UE 502 is configured to generate a plurality of receive beams 508*a*-508*e*, each associated with a different spatial direction. It should be noted that while some beams are illustrated as adjacent to one another, such an arrangement may be different in different aspects. For example, transmit beams 506*a*-506*h* transmitted during a same symbol may not be adjacent to one another. In some examples, the base station 504 and UE 502 may each transmit more or less beams distributed in all directions (e.g., 360 degrees) and in three-dimensions. In addition, the transmit beams 506*a*-506*h* may include beams of varying beam width. For example, the base station 504** may transmit certain signals (e.g., SSBs) on wider beams and other signals (e.g., CSI-RSs) on narrower beams.

The base station 504 and UE 502 may select one or more transmit beams **506*a*-506*h* on the base station 504 and one or more receive beams 508*a*-508*e* on the UE 502 for communication of uplink and downlink signals therebetween using a beam management procedure. In one example, during initial cell acquisition, the UE 502 may perform a P1 beam management procedure to scan the plurality of transmit beams 506*a*-506*h* on the plurality of receive beams 508*a*-508*e* to select a beam pair link (e.g., one of the transmit beams 506*a*-506*h* and one of the receive beams 508*a*-508*e*) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506**h. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 504 and UE 502 may perform a P2 beam management procedure for beam refinement. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP) of one or more of the CSI-RS transmit beams 506a-506h on one or more of the receive beams 508a-508e to the base station 504. The base station 504 may then select one or more CSI-RS transmit beams on which to transmit unicast downlink control information and/or user data traffic to the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective downlink beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in the different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to transmit unicast downlink control information and/or user data traffic to the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In addition to L1 measurement reports, the UE 502 can further utilize the beam reference signals to estimate the channel quality of the channel between the base station 504 and the UE 502. For example, the UE 502 may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

Figure 6:
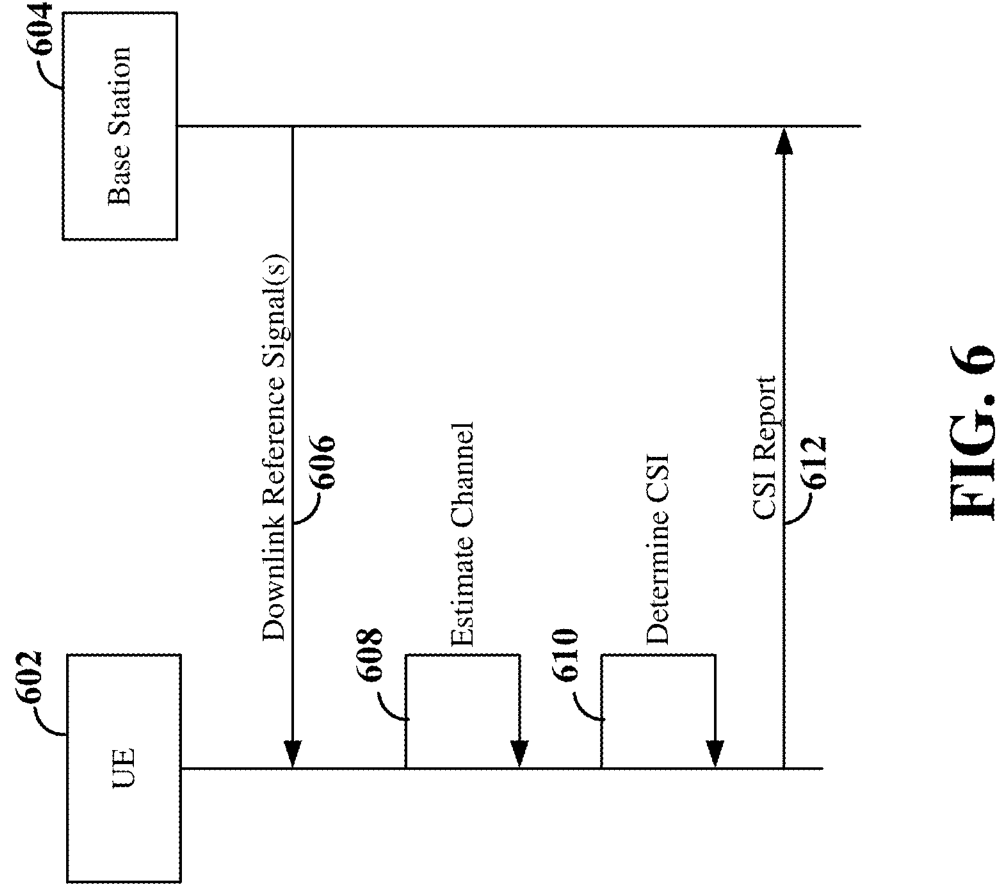
FIG. 6 is a signaling diagram illustrating an example of signaling between a UE and a base station for channel state information (CSI) reporting according to some aspects.

FIG. 6 is a signaling diagram illustrating exemplary signaling between a UE 602 and a base station 604 for channel state information reporting according to some aspects. The UE 602 may correspond, for example, to any of the UEs or other scheduled entities shown in FIGS. 1, 2, and/or 4. The base station 604 may correspond, for example, to any of the base stations (e.g., gNB or eNB) or other scheduling entities as shown in FIGS. 1, 2, and/or 4.

At 606, the base station 604 may transmit a downlink reference signal, such as a CSI-RS, to the UE 602. In some examples, the downlink reference signal may include a plurality of downlink reference signals. Each downlink reference signal may be transmitted via a respective CSI resource. CSI resources may include time-frequency resources, along with a beam direction (spatial direction), within which a particular downlink reference signal can be transmitted. In addition, each downlink reference signal may include a number of pilots allocated within the respective CSI resource. In some examples, the different spatial directions of the CSI resources may support MIMO (e.g., spatial multiplexing).

At 608, the UE 602 can estimate the downlink wireless channel from the downlink reference signal(s). For example, the UE 602 may measure the SINR of one or more of the downlink reference signals to obtain a downlink channel estimate of the downlink wireless channel.

At 610, for example, the UE 602 may determine the CSI. For example, the UE 602 may determine a RI, PMI, CQI, and LI from the downlink channel estimate. The CQI may include an index (e.g., a CQI index) ranging, for example, from 0 to 16. The CQI index may indicate, for example, the highest MCS at which the Block Error Rate (BLER) of the channel does not exceed 10%. Once selected, the RI, PMI, LI, and CQI index can be fed back in a CSI report. For example, at 612, the UE 602 may transmit the CSI report, including the selected CQI, along with the RI, PMI, and SLI, to the base station 604.

The base station 604 and UE 602 may support different types of CSI reports (including L1 measurement reports) and/or different types of measurements. To distinguish between the different types of CSI reports and different types of measurements, the base station 604 may configure the UE 602 with one or more CSI report settings.

Figure 7:
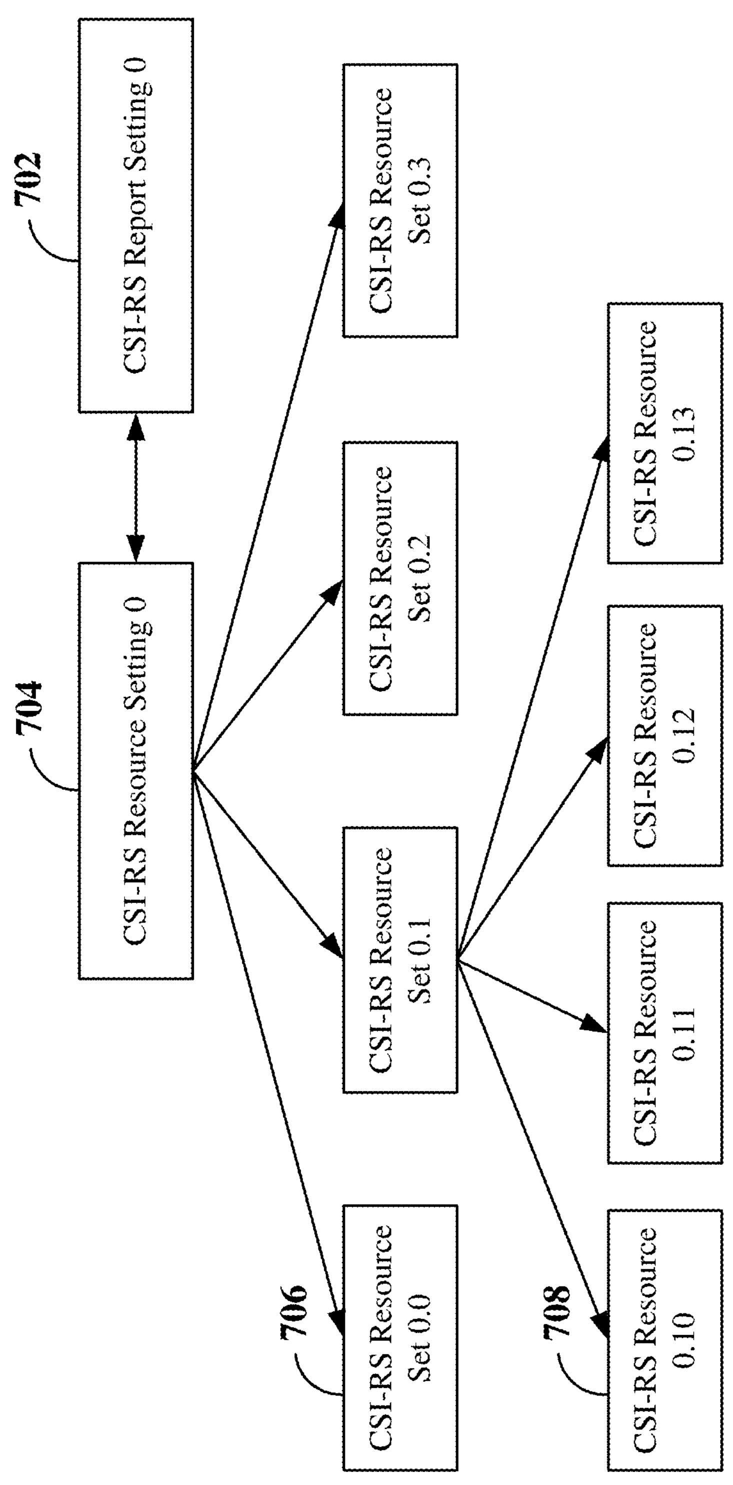
FIG. 7 is a diagram illustrating an example of channel state information (CSI) resource mapping according to some aspects.

FIG. 7 illustrates an exemplary CSI resource mapping to support different report/measurement configurations according to some aspects. The CSI resource mapping includes CSI report setting 702, CSI resource settings 704, CSI resource sets 706, and CSI resources 708. Each CSI resource setting 704 includes one or more CSI resource sets 706, and each CSI resource set 706 includes one or more CSI resources 708. In the example shown in FIG. 7, a single CSI resource setting (e.g., CSI resource setting 0) is illustrated. However, it should be understood that any suitable number of CSI resource settings 704 may be supported.

Each CSI report setting 702 may include a reportQuantity that indicates, for example, the specific CSI values and granularity thereof (e.g., wideband/sub-band CQI, PMI, RI, LI, etc.), or L1 parameters (e.g., L1-RSRP, L1-SINR) to include in a CSI report. The CSI report setting may further indicate a periodicity of the CSI report. For example, the CSI report setting may indicate that the report should be generated periodically, aperiodically, or semi-persistently. For aperiodic CSI report settings, the CSI report may be sent on the PUSCH and may or may not be multiplexed with uplink data. For periodic CSI report settings, the CSI report may be sent on the PUCCH (e.g., a short PUCCH or a long PUCCH). For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). The DCI triggering the semi-persistent CSI reporting may further allocate semi-persistent resources and an MCS for the CSI report. Semi-persistent CSI report settings may further support Type II codebooks and a minimum periodicity of 5 ms. In some examples, periodic and semi-persistent CSI report settings may support the following periodicities: {5, 10, 20, 40, 80, 160, and 320} slots. CSI report settings may further include a respective priority and other suitable parameters.

Each CSI report setting 702 may further be linked to a CSI resource setting 704 indicating the CSI resources 708 applicable to the CSI report setting 702. Each CSI resource setting 704 may be associated with a particular time domain behavior of reference signals. For example, each CSI resource setting 704 may include periodic, semi-persistent, or aperiodic CSI resources 708. For periodic and semi-persistent CSI resource settings 704, the number of configured CSI resource sets 706 may be limited to one. In general, the CSI resource settings 704 that may be linked to a particular CSI report setting 702 may be limited by the time domain behavior of the CSI resource setting 704 and the CSI report setting 702. For example, an aperiodic CSI report setting 702 may be linked to periodic, semi-persistent, or aperiodic CSI resource settings 704. However, a semi-persistent CSI report setting 702 may be linked to only periodic or semi-persistent CSI resource settings 704. In addition, a periodic CSI report setting 702 may be linked to only a periodic CSI resource setting 704.

Each CSI resource set 706 may be associated with a CSI resource type. For example, CSI resource types may include non-zero-power (NZP) CSI-RS resources, SSB resources, or channel state information interference measurement (CSI-IM) resources. Thus, each CSI resource set 706 includes a list of CSI resources 708 of a particular CSI resource type. In addition, each CSI resource set 706 may further be associated with one or more of a set of frequency resources (e.g., a bandwidth and/or OFDM symbol(s) within a slot), a particular set of ports, a power, or other suitable parameters.

Each CSI resource 708 indicates the particular beam (e.g., one or more ports), frequency resource, and OFDM symbol on which the reference signal may be measured by the wireless communication device. For example, each CSI-RS resource 708 may indicate an RE on which a CSI-RS pilot or SSB transmitted from a particular set of ports (e.g., on a particular beam) may be measured. In the example shown in FIG. 7, CSI-RS resource set 0.1 includes four CSI-RS resources (CSI-RS resource 0.10, CSI-RS resource 0.11, CSI-RS resource 0.12, and CSI-RS resource 0.13). Each CSI resource 708 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

The base station may configure the UE with one or more CSI report settings 702 and CSI resource settings 704 via, for example, radio resource control (RRC) signaling. For example, the base station may configure the UE with a list of periodic CSI report settings indicating an associated CSI resource set that the UE may utilize to generate periodic CSI reports. As another example, the base station may configure the UE with a list of aperiodic CSI report settings in a CSI-AperiodicTriggerStateList. Each trigger state in the CSI-AperiodicTriggerStateList may include a list of aperiodic CSI report settings indicating the associated CSI resource sets for channel (and optionally interference) measurement. As another example, the base station may configure the UE with a list of semi-persistent CSI report settings in a CSI-SemiPersistentOnPUSCH-TriggerStateList. Each trigger state in the CSI-SemiPersistentOnPUSCH-TriggerStateList may include one CSI report setting indicating the associated CSI resource set. The base station may then trigger one or more of the aperiodic or semi-persistent trigger states using, for example, DCI. As indicated above, a MAC-CE may be used to activate or deactivate a semi-persistent CSI report setting for a CSI report sent on the PUCCH.

Figure 8:
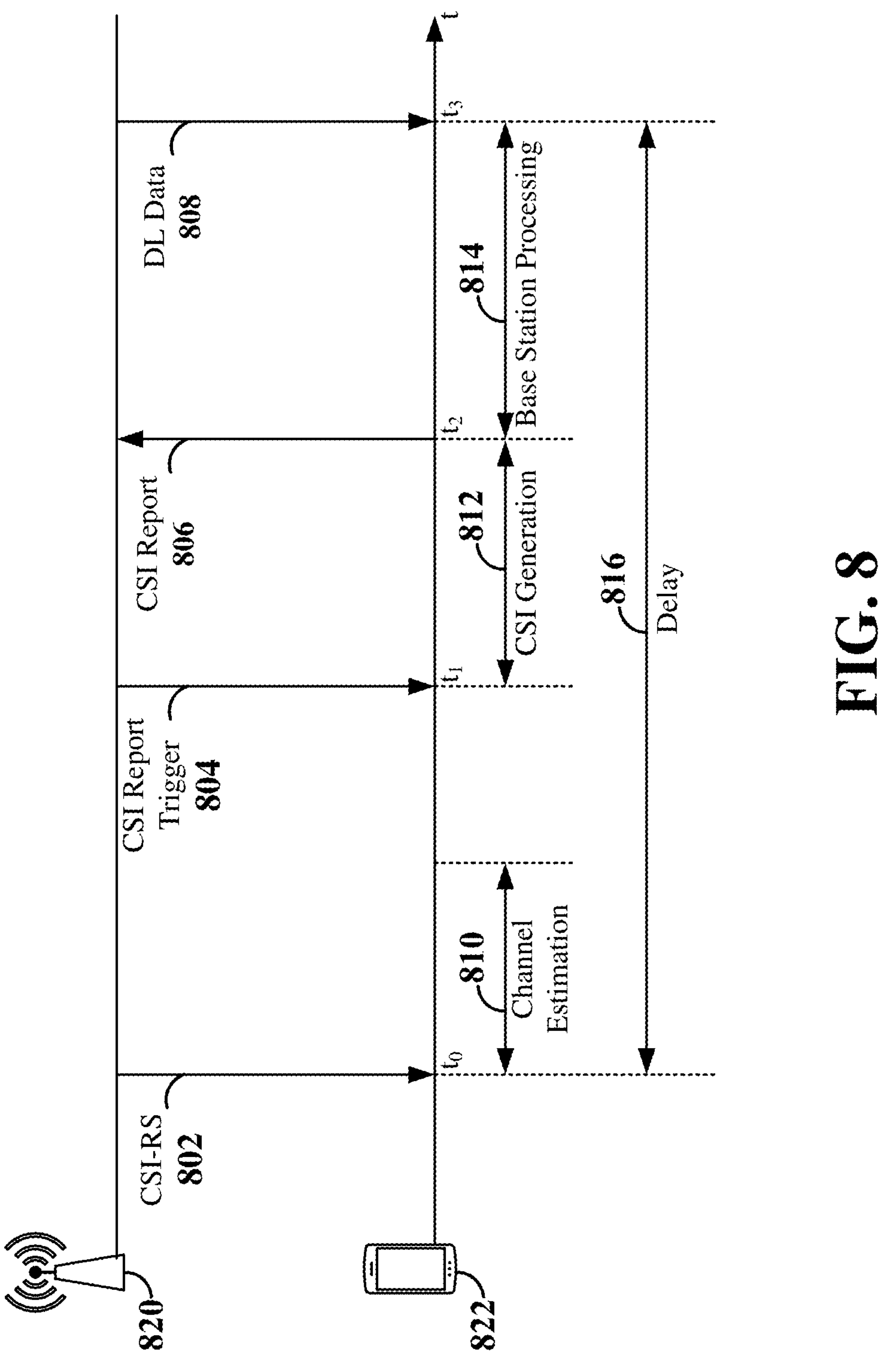
FIG. 8 is a diagram illustrating exemplary delays in CSI reporting according to some aspects.

FIG. 8 is a diagram illustrating exemplary delays in CSI reporting between a base station 820 and a UE 822 according to some aspects. The UE 822 may correspond, for example, to any of the UEs or other scheduled entities shown in FIGS. 1, 2, 4, and/or 6. The base station 820 may correspond, for example, to any of the base stations (e.g., gNB or eNB) or other scheduling entities as shown in FIGS. 1, 2, 4, and/or 6.

In the example shown in FIG. 8, the base station 820 may transmit a CSI-RS 802 to the UE 822 at an initial time to. Based on the received CSI-RS 802, the UE 822 may perform a channel estimation 810 of the downlink wireless channel. For example, the UE 822 may measure the SINR of the CSI-RS to obtain a downlink channel estimate of the downlink wireless channel.

At time $t_1$, the UE 822 may receive a CSI report trigger from the base station 820. For example, the CSI report trigger may trigger an aperiodic CSI report using the channel estimation 810 obtained from the CSI-RS 802 received at time $t_0$. Upon receiving the CSI report trigger, the UE 822 may generate CSI values 812 for inclusion in a CSI report. For example, the UE 822 may determine one or more of a RI, PMI, CQI, and LI from the downlink channel estimate 810. Once selected, the RI, PMI, LI, and/or CQI index can be fed back in a CSI report 806 at time $t_2$. For example, the UE 822 may transmit the CSI report 806, including the selected CQI, along with the RI, PMI, and LI, to the base station 820.

The base station 820 may process 814 the CSI report to select the rank, precoding matrix, and MCS for a downlink (DL) data transmission 808 to the UE 822 at time $t_3$. As shown in FIG. 8, there is a delay 816 between the time $t_0$ at which the CSI-RS 802 is received and the time $t_3$ at which the DL data transmission 808 is received. In some examples, this delay 816 may result in outdated CSI being utilized by the base station 820 for the DL data transmission 808. The outdated CSI may not reflect the real-time channel, especially for rapidly changing channels, such as may be experienced by a high-speed moving UE 822. In this example, the base station 820 may configure the UE 822 with multiple, continuous CSI reports to more accurately predict the channel for DL data transmissions. However, this increases the signaling overhead in the network and may result in increased power consumption and processing at the UE 822.

Therefore, in various aspects of the disclosure, the base station 820 may configure a single CSI report that includes time domain channel information obtained from multiple CSI-RSs received by the UE 822 over time. For example, the base station 820 may configure multiple CSI resources/resource sets corresponding to a single CSI report. Each of the CSI resources/resource sets may be associated with a different respective time resource (e.g., each CSI-RS corresponding to a CSI resource is received at a different respective time). The UE 822 may measure the SINR of each received CSI-RS over time to obtain the time domain channel information. The base station 820 may then utilize the time domain channel information included in the CSI report to predict the channel for DL data transmissions.

Figure 9:
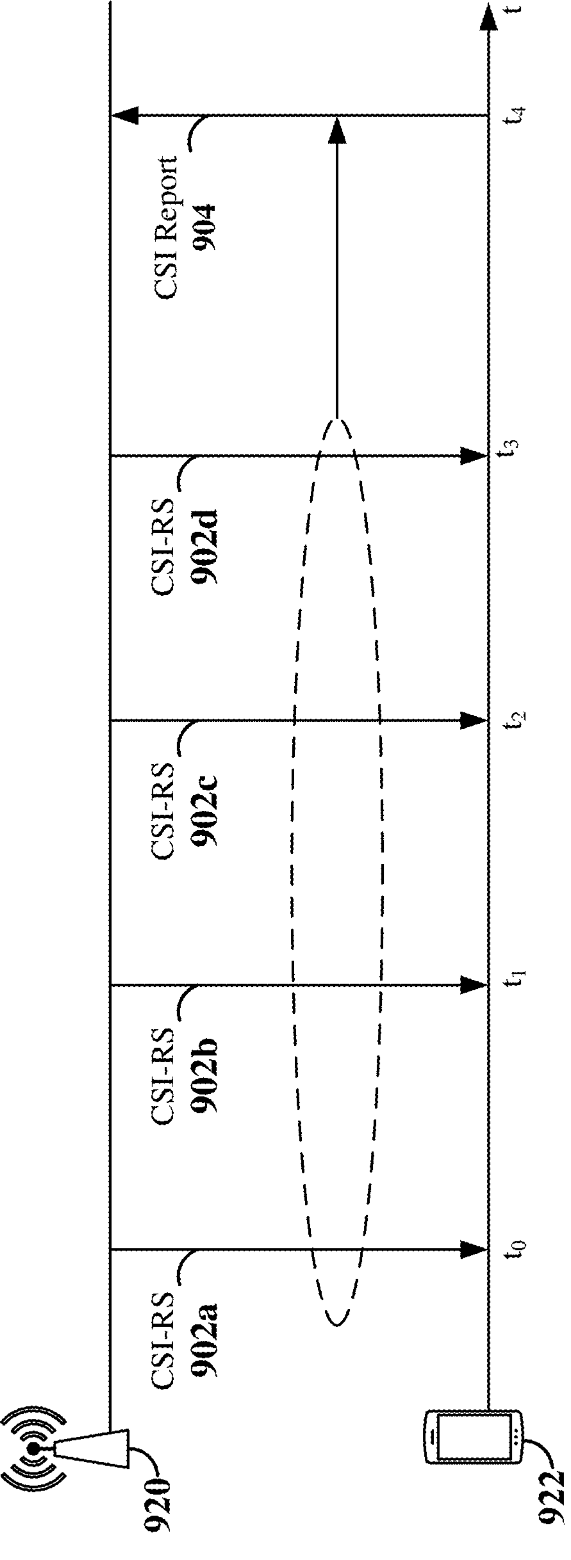
FIG. 9 is a diagram illustrating exemplary signaling for time domain channel estimation according to some aspects.

FIG. 9 is a diagram illustrating exemplary signaling between a base station 920 and a UE 922 for time domain channel estimation according to some aspects. The UE 922 may correspond, for example, to any of the UEs or other scheduled entities shown in FIGS. 1, 2, 4, 6 and/or 8. The base station 920 may correspond, for example, to any of the base stations (e.g., gNB or eNB) or other scheduling entities as shown in FIGS. 1, 2, 4, 6, and/or 8.

In the example shown in FIG. 9, the UE 922 may receive a plurality of CSI-RS 902*a*-902*d* over time from the base station 920. For example, a first CSI-RS 902*a* may be received at a first time $t_0$, a second CSI-RS 902*b* may be received at a second time $t_1$, a third CSI-RS 902*c* may be received at a third time $t_2$, and a fourth CSI-RS 902*d* may be received a fourth time $t_3$.

Based on the each of the received CSI-RSs 902*a*-902*d*, the UE 922 may obtain time domain channel information of the downlink wireless channel. For example, the UE 922 may measure the SINR of each of the CSI-RSs 902*a*-902*d* to obtain a respective downlink channel estimate of the downlink wireless channel associated with each of the CSI-RSs 902*a*-902*d*. The UE 922 may then generate a plurality of CSI values (e.g., RI, PMI, LI, and/or CQI) based on each of the respective downlink channel estimates. In some examples, the UE 922 may generate a respective set of CSI values (e.g., a respective set of RI, PMI, LI, and/or CQI) for each of the CSI-RSs 902*a*-902*d*. For example, the UE 922 may generate a first set of CSI values (e.g., a first set of RI, PMI, LI, and/or CQI) based on the channel estimate obtained for CSI-RS 902*a*, a second set of CSI values (e.g., a second set of RI, PMI, LI, and/or CQI) based on the channel estimate obtained for CSI-RS 902*b*, a third set of CSI values (e.g., a third set of RI, PMI, LI, and/or CQI) based on the channel estimate for CSI-RS 902*c*, and a fourth set of CSI values (e.g., a fourth set of RI, PMI, LI, and/or CQI) based on the channel estimate for CSI-RS 902*d*.

The UE 922 may then determine the time domain channel information based on the CSI values and, at time $t_4$, transmit a single CSI report 904 to the base station 920 including the time domain channel information. In some examples, the time domain channel information may include the plurality of CSI values (e.g., each of the sets of CSI values). In this example, the CSI report setting may include a reportQuantity that indicates, for example, each of the plurality of CSI values for each of the plurality of CSI-RSs 902*a*-902*d* and the granularity thereof (e.g., wideband/sub-band CQI, PMI, RI, LI, etc.) to include in the CSI report 904. In other examples, the time domain channel information may include compressed channel information based on the plurality of CSI values to reduce the overhead (e.g., the amount of resources) for the CSI report 904. For example, the time domain channel information may be compressed in one or more of a time domain, frequency domain, or spatial domain. The base station 920 may then utilize the compressed channel information to reconstruct the channel. In this example, the CSI report setting may indicate the compressed channel information to include in the CSI report. For example, the CSI report setting may indicate the number of coefficients to include in the CSI report based on the type of transform and transform domains (e.g., time, frequency, and/or spatial) utilized for compression, whether the UE is to report long-term amplitude and/or long-term distribution function parameters, along with short-term phase coefficients or short-term differential phase coefficients, and other suitable compressed channel information.

Figure 10:
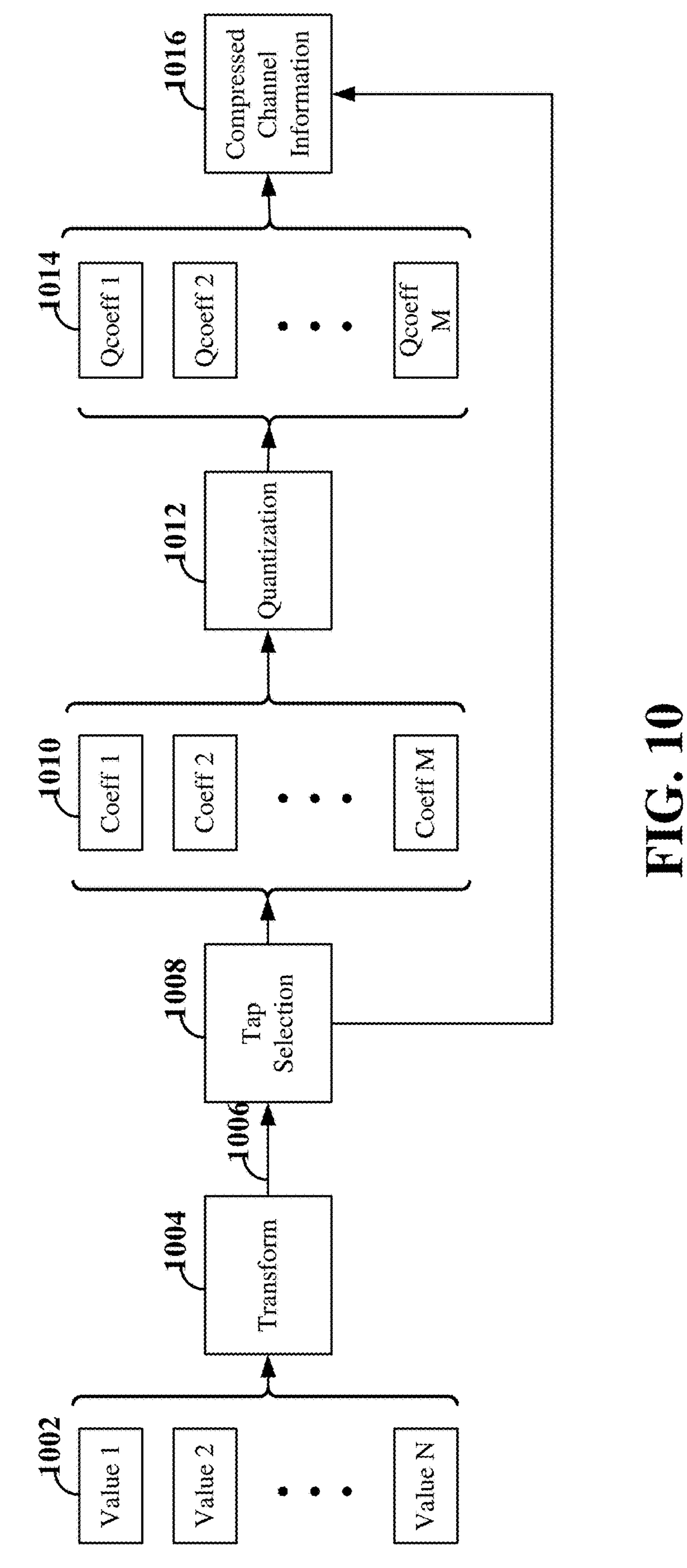
FIG. 10 is a diagram illustrating an example of compression circuitry configured to compress time domain channel information according to some aspects.

FIG. 10 is a diagram illustrating an example of compression circuitry 1000 within a UE configured to compress time domain channel information according to some aspects. The compression circuitry 1000 includes transform circuitry 1004, tap selection circuitry 1008, and quantization circuitry 1012.

The transform circuitry 1004 is configured to receive a plurality of CSI values (Value 1, Value 2, . . . , Value N) 1002 obtained by the UE over time. The transform circuitry 1004 is further configured to apply a transform to the plurality of CSI values 1002 to produce a plurality of transform values 1006. By way of example, but not limitation, the transform may include a Discrete Fourier Transform (DFT) or a Discrete Cosine Transform (DCT). DCTs operate on real numbers, whereas DFTs may operate on complex numbers.

The CSI values 1002 may include, for example, RIs, PMIs, LIs, and/or CQIs obtained by the UE over time. For example, the CSI values 1002 may include a respective set of CSI values for each of a plurality of CSI types (e.g., RI, PMI, LI, CQI, etc.). Each set of CSI values 1002 may be separately compressed. For example, each of the CSI values 1002 in one of the sets of CSI values may be a PMI determined by the UE based on a respective CSI-RS received by the UE. Using the example shown in FIG. 9, each PMI may correspond to the PMI determined for one of the CSI-RSs 902*a*-902*d*. The transform circuitry 1004 may apply a time domain transform to the set of PMI values obtained from the CSI-RSs received over time to produce the plurality of transform values 1006 for the set of PMI values. The transform circuitry 1004 may apply similar time domain transforms to the other sets of CSI values (e.g., RI values, CQI values, LI values, etc.).

The plurality of transform values 1006 produced by the transform circuitry 1004 may then be input to the tap selection circuitry 1008. The tap selection circuitry 1008 is configured to select a number of taps (e.g., transform values) from the plurality of transform values to produce a plurality of coefficients (Coeff 1, Coeff 2, . . . , Coeff M) 1010. The number of taps may be pre-configured on the UE (e.g., by the original equipment manufacturer (OEM) based on, for example, 3GPP standards and/or specifications) or may be configured by the base station. For example, the base station may transmit an RRC message to the UE indicating the number of taps for the time domain transform. In some examples, the number of taps may be included in the CSI report setting for the UE. Based on the number of taps, the UE may select the coefficients 1010 from the plurality of transform values 1006. In some examples, the selected coefficients 1010 may correspond to the largest coefficients (e.g., largest transform values) in the plurality of transform values 1006.

The quantization circuitry 1012 may then be configured to quantize the plurality of coefficients 1010 using, for example, a non-uniform quantization, to produce a plurality of quantized time domain coefficients 1014 (Qcoeff 1, Qcoeff 2, . . . , Qcoeff M) that may be fed back to the base station as compressed channel information 1016 within a CSI report. The base station may then use the quantized time domain coefficients 1014 to reconstruct the channel (e.g., recover the original CSI values) and select an MCS, precoder, and rank for a DL data transmission to the UE. In some examples, the quantization circuitry 1012 may quantize the plurality of coefficients using one or more quantization tables, which may be stored in the UE. For example, the quantization tables may be pre-configured on the UE or provided to the UE by the base station. In some examples, the compressed channel information 1016 may further include respective indices of each of the plurality of taps, as provided by the tap selection circuitry 1008.

In some examples, the transform circuitry 1004 may apply a respective time domain transform per sub-band. For example, the CSI values 1002 may further include a respective subset of CSI values for each sub-band of a plurality of sub-bands. For example, the CSI values 1002 may include a set of PMI values obtained over time and the set of PMI values may further include subsets of PMI values per sub-band. In an example, a first subset of PMI values may be associated with a first sub-band, a second subset of PMI values may be associated with a second sub-band, and so on. Each subset (e.g., first subset, second subset, etc.) may include the PMI values for that sub-band obtained based on each of the plurality of CSI-RSs (e.g., CSI-RSs 902*a*-902*d* shown in FIG. 9) received over time. The transform circuitry 1004 may apply a separate time domain transform to each of the subsets of CSI values 1002. In some examples, the time domain transforms applied to at least two of the subsets of CSI values 1002 may be different. For example, the transform circuitry 1004 may apply a DFT to the first subset of PMI values and a DCT to the second subset of PMI values.

In some examples, the CSI values 1002 may include multiple CSI values in the frequency domain for each CSI-RS (e.g., CSI-RSs 902*a*-902*d* shown in FIG. 9). For example, each of the CSI values 1002 associated with one of the CSI-RSs (e.g., CSI-RS 902*a*) may be a wideband or sub-band CSI value. In other examples, the CSI values 1002 may include multiple CSI values in the spatial domain (e.g., based on CSI-RSs associated with different spatial beams). Thus, the CSI values 1002 may be representative of the channel in the time domain, spatial domain, and frequency domain. As an example, the channel H may be represented as:

$$H\_\{N_{time} * N_{UEAnt} * N_{gNBAnt} * N_{SC}\}, \quad \text{(Equation 1)}$$

where $N_{time}$ is the number of CSI values 1002 in the time domain (e.g., PMI values for each received CSI-RS over time), $N_{UEAnt}$ and $N_{gNBAnt}$ is the number of CSI values 1002 in the spatial domain (e.g., PMI values based on UE beam and gNB beam), and $N_{SC}$ is the number of CSI values in the frequency domain (e.g., PMI value per set of subcarriers, such as wideband or sub-band).

The transform circuitry 1004 may apply a time domain transform or a combination of a time domain transform together with one or more of a frequency domain transform or a spatial domain transform to the plurality of CSI values 1002. For example, the transform circuitry 1004 may apply a time domain transform prior to applying at least one of a spatial domain transform or a frequency domain transform. In an example, the transform circuitry 1004 may apply a time domain transform to obtain the plurality of quantized time domain coefficients 1014. The transform circuitry 1004 may then apply a spatial domain transform to the plurality of quantized time domain coefficients 1014 to produce a plurality of spatial domain quantized coefficients. The transform circuitry 1004 may then apply a frequency domain transform to the plurality of spatial domain quantized coefficients to produce a plurality of frequency domain quantized coefficients. In this example, the compressed channel information 1016 may include the quantized time domain coefficients 1014, the spatial domain quantized coefficients, and the frequency domain quantized coefficients. As another example, the transform circuitry 1004 may apply at least one of a spatial domain transform or a frequency domain transform prior to applying the time domain transform.

In examples in which the transform circuitry 1004 utilizes a DFT, the resulting coefficients 1010 include both amplitude and phase components. To further compress the time domain channel information, the compressed channel information may include the phase components (referred to herein as phase coefficients), along with long-term parameters(s) representative of the long-term amplitude.

Figure 11:
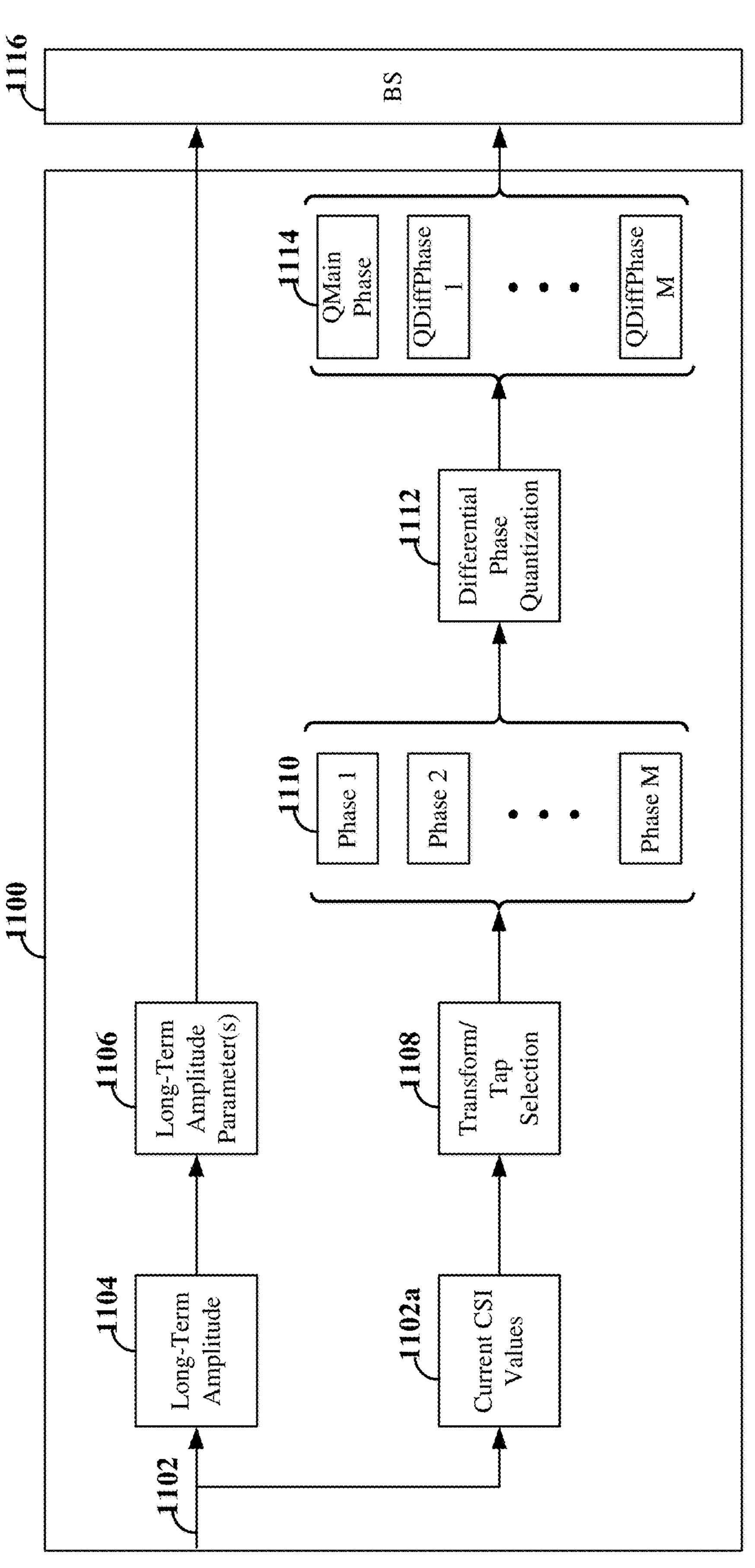
FIG. 11 is a diagram illustrating another example of compression circuitry configured to compress time domain channel information according to some aspects.

FIG. 11 is a diagram illustrating another example of compression circuitry 1100 within a UE configured to compress time domain channel information according to some aspects. The compression circuitry 1100 includes long-term amplitude circuitry 1104, transform/tap selection circuitry 1108, and differential phase quantization circuitry 1112.

The long-term amplitude circuitry 1104 is configured to receive a number of CSI values 1102 including current CSI values 1102*a* (e.g., the CSI values obtained based on the plurality of CSI-RSs 902*a*-902*d* shown in FIG. 9) and additional CSI values obtained prior to the current CSI values 1102*a*. The number of CSI values 1102 and current CSI values 1102*a* may be pre-configured on the UE or may be configured by the base station. As an example, the number of CSI values 1102 may be based on CSI-RSs received over a frame, whereas the current CSI values 1102*a* may be based on CSI-RSs received over a current slot. The CSI values 1102 and 1102*a* may include, for example, RI values, PMI values, CQI values, LI values, etc. As described above in connection with FIG. 10, the compression circuitry 1100 may be configured to separately compress each CSI type (e.g., RI, PMI, CQI, LI, etc.).

The long-term amplitude circuitry 1104 is further configured to determine at least one long-term amplitude parameter 1106 based on the number of CSI values 1102. In some examples, the long-term amplitude parameter(s) 1106 may include an average of the amplitudes of the number of CSI values 1102. In this example, the long-term amplitude circuitry 1104 may be configured to calculate the amplitude of each of the CSI values 1102 and take the average of the amplitudes to produce the long-term amplitude parameter 1106. In other examples, the long-term amplitude circuitry 1104 may apply at least a time domain transform (e.g., a DFT) to the number of CSI values 1102 to obtain a plurality of long-term coefficients. In some examples, the long-term amplitude circuitry 1104 may further apply a frequency domain and/or spatial domain transform to the CSI values 1102. The long-term coefficients include both amplitude and phase components. Thus, the long-term amplitude circuitry 1104 is further configured to determine the amplitude components of the long-term coefficients to produce long-term amplitude coefficients. In this example, the long-term amplitude parameter(s) 1106 may include the long-term amplitude coefficients, along with the indices of the taps (e.g., selected transform values) of the long-term amplitude coefficients. In other examples, the long-term amplitude circuitry 1104 may apply a different function or filter to the number of CSI values 1102 to produce the long-term amplitude parameter(s) 1106.

The transform/tap selection circuitry 1108 is configured to receive the current CSI values 1102*a* of the number of CSI values 1102. The transform/tap selection circuitry 1108 is further configured to apply at least a time domain transform to the current CSI values 1102*a* to produce a plurality of transform values. In some examples, the transform/tap selection circuitry 1108 may further apply a frequency domain and/or spatial domain transform to the current CSI values 1102*a*. The transform/tap selection circuitry 1108 is further configured to select a plurality of taps from the plurality of transform values to produce a plurality of short-term coefficients. The plurality of short-term coefficients include both amplitude and phase components. Thus, the transform/tap selection circuitry 1108 is further configured to determine the phase components of each of the coefficients to produce a plurality of short-term phase coefficients 1110 (Phase 1, Phase 2, . . . Phase M). In examples in which the long-term amplitude parameter(s) 1106 are based on at least a time domain transform, the transform/tap selection circuitry 1108 may be configured to produce both the short-term phase coefficients and the long-term amplitude coefficients. In this example, the long-term amplitude circuitry 1104 may be included as part of the transform/tap selection circuitry 1108.

The differential phase quantization circuitry 1112 is configured to determine a main (first) phase coefficient from the plurality of short-term phase coefficients 1110. In some examples, the main phase coefficient may be the first received short-term phase coefficient. In other examples, the main phase coefficient may be the short-term phase coefficient with the highest or lowest value with respect to the other short-term phase coefficients. It should be understood that any suitable criteria may be utilized by the differential phase quantization circuitry 1112 to identify the main phase coefficient. In some examples, an index of the main phase coefficient may be configured by the base station or pre-configured or determined by the UE (e.g., based on one or more criteria). For the latter, the UE may include the main phase coefficient index in the CSI report.

The differential phase quantization circuitry 1112 is further configured to calculate differential phase coefficients with respect to the main phase coefficient based on the remaining short-term phase coefficients 1110. In addition, the differential phase quantization circuitry 1112 is further configured to quantize the main phase coefficient and each of the differential phase coefficients to produce a plurality of quantized phase coefficients 1114 (QMain Phase, QDiffPhase 1, . . . , QDiffPhase M). For example, the differential phase quantization circuitry 1112 may identify Phase 1 as the main phase coefficient (MainPhase) and determine a difference between Phase 1 and Phase 2 as a differential phase coefficient (DiffPhase 1). The differential phase quantization circuitry 1112 may then quantize the main phase coefficient to produce QMainPhase and the differential phase coefficient DiffPhase 1 to produce QDiffPhase 1. The differential phase quantization circuitry 1112 may repeat this process for each phase coefficient.

In some examples, the differential phase quantization circuitry 1112 may apply a different quantization to each of the main phase coefficient and the differential phase coefficients. For example, the differential phase quantization circuitry 1112 may utilize Q1 (e.g., 3 bits) quantization for the main phase coefficient and Q2 (e.g., 2 bits) quantization for each of the differential phase coefficients.

The compression circuitry 1100 may then feed back both the long-term amplitude parameter(s) 1106 and the plurality of quantized phase coefficients 1114 (e.g., quantized main phase coefficient and quantized differential phase coefficients) as compressed channel information within a CSI report to the base station 1116. The base station 1116 may then use the long-term amplitude parameter(s) 1106 and short-term quantized phase coefficients 1114 to reconstruct the channel and select an MCS, precoder, and rank for a DL data transmission to the UE.

Figure 12:
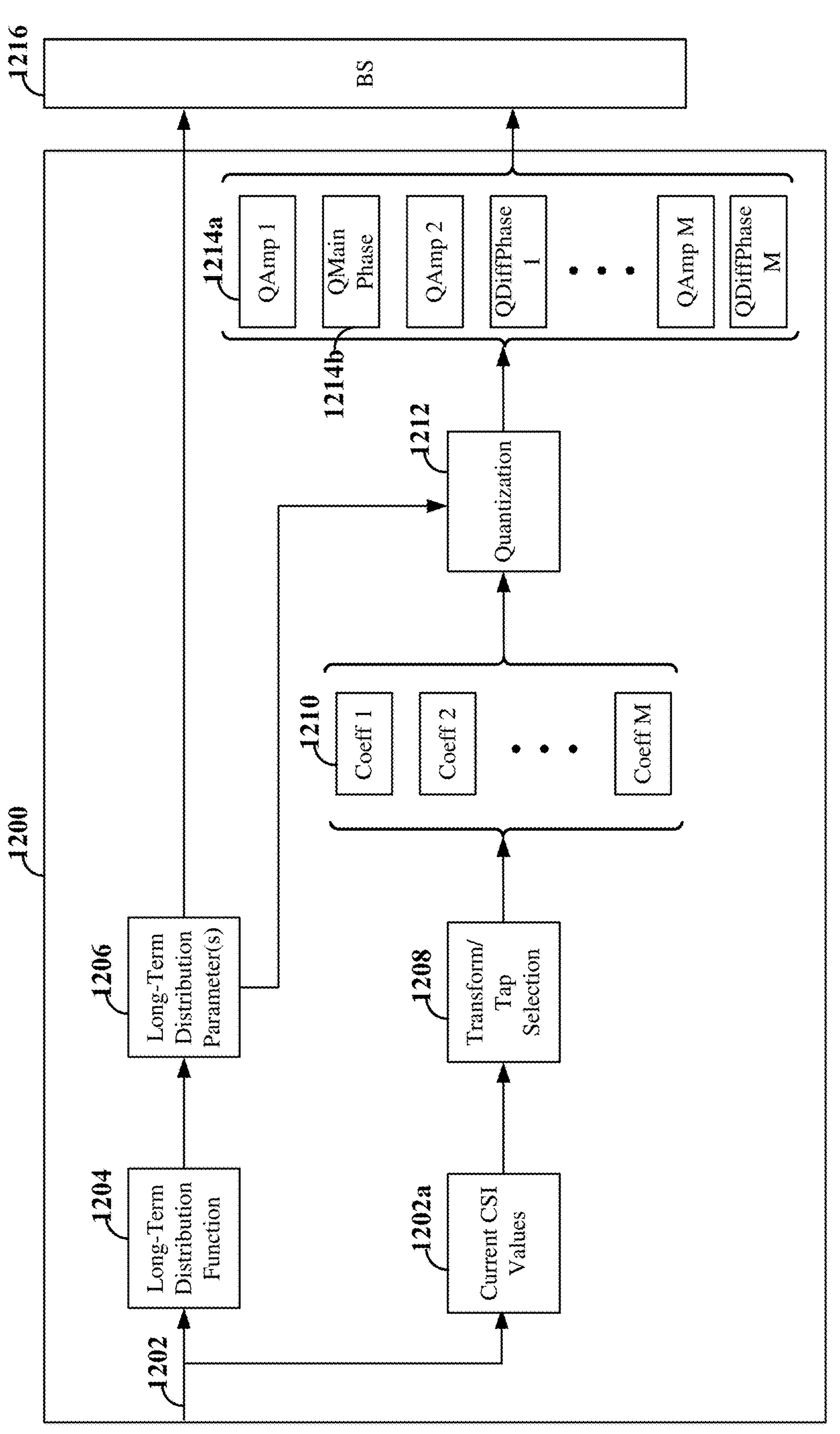
FIG. 12 is a diagram illustrating another example of compression circuitry configured to compress time domain channel information according to some aspects.

FIG. 12 is a diagram illustrating another example of compression circuitry 1200 within a UE configured to compress time domain channel information according to some aspects. The compression circuitry 1200 includes long-term distribution function circuitry 1204, transform/tap selection circuitry 1208, and quantization circuitry 1212.

The long-term distribution function circuitry 1204 is configured to receive a number of CSI values 1202 including current CSI values 1202*a* (e.g., the CSI values obtained based on the plurality of CSI-RSs 902*a*-902*d* shown in FIG. 9) and additional CSI values obtained prior to the current CSI values 1202*a*. The number of CSI values 1202 and current CSI values 1202*a* may be pre-configured on the UE or may be configured by the base station. As an example, the number of CSI values 1202 may be based on CSI-RSs received over a hundred slots, whereas the current CSI values 1202*a* may be based on CSI-RSs received over five slots. The CSI values 1202 and 1202*a* may include, for example, RI values, PMI values, CQI values, LI values, etc. As described above in connection with FIGS. 10 and 11, the compression circuitry 1200 may be configured to separately compress each CSI type (e.g., RI, PMI, CQI, LI, etc.).

The long-term distribution function circuitry 1204 is further configured to determine at least one long-term distribution parameter 1206 based on the number of CSI values 1202. In some examples, the long-term distribution function circuitry 1204 may apply a probability distribution function (PDF) or cumulative distribution function (CDF) to the number of CSI values. Examples of a PDF include a normal (or Gaussian) distribution function or a Rayleigh distribution function. For a Gaussian distribution function, the PDF is:

$$f_x = \frac{1}{\sigma\sqrt{2\pi}} e^{-\frac{1}{2}\left(\frac{x-\mu}{\sigma}\right)^2}, \quad \text{(Equation 2)}$$

where x is the input (e.g., the CSI values 1202), μ is the mean of the distribution, and σ is the standard deviation ($\sigma^2$ is the variance of the distribution). In this example, the long-term distribution parameters 1206 may include the mean and variance of the distribution. For a Rayleigh distribution function, the PDF is:

$$f(x, \sigma) = \frac{x}{\sigma^2} e^{-x^2/(2\sigma^2)}, \quad \text{(Equation 3)}$$

where x is the input (e.g., the CSI values 1202) and σ is the scale parameter for the distribution. In this example, the long-term distribution parameter 1206 may include the scale parameter.

In some examples, the long-term distribution function circuitry 1204 may be configured to calculate the amplitude of each of the CSI values 1202 and apply the PDF/CDF to the amplitudes to produce the at least one long-term distribution parameter 1206. In some examples, the number of CSI values 1202 may include a plurality of sets of CSI values, each associated with a respective reference signal (e.g., CSI-RS) of a set of reference signals. For example, the set of reference signals may include the plurality of CSI-RSs 902*a*-902*d* shown in FIG. 9 and additional reference signals (e.g., CSI-RSs) received prior to the plurality of CSI-RSs 902*a*-902*d*. Each set of CSI values may include CSI values obtained in a corresponding frequency domain or a corresponding spatial domain for the associated CSI-RS. In this example, the long-term distribution function circuitry 1204 may apply the PDF/CDF to each set of CSI values to produce respective long-term distribution parameters 1206 for each set of one or more subcarrier frequencies (e.g., wideband or sub-band) and/or each spatial direction.

In other examples, the long-term distribution function circuitry 1204 may apply at least one of a frequency domain or a spatial domain transform (e.g., a DFT) to the number of CSI values 1202 to obtain a plurality of long-term coefficients. In this example, the number of CSI values 1202 may include the plurality of sets of CSI values. The long-term distribution function circuitry 1204 may apply a respective transform (e.g., a frequency domain or spatial domain transform) to each set of CSI values to produce respective sets of transform values. The long-term distribution function circuitry 1204 may then select a respective set of taps from each of the sets of transform values to produce respective sets of coefficients. The long-term distribution function circuitry 1204 may then sort the sets of coefficients into respective groups of coefficients. Each group of coefficients includes corresponding coefficients that are corresponding in one of a frequency domain or a spatial domain. The coefficients include both amplitude and phase components. Thus, the long-term distribution function circuitry 1204 is further configured to determine the amplitude components of the coefficients to produce respective groups of long-term amplitude coefficients. For each of the groups of long-term amplitude coefficients, the long-term distribution function circuitry 1204 may apply a respective distribution function to determine the respective at least one long-term distribution parameter 1206 for each of the groups of long-term amplitude coefficients.

The transform/tap selection circuitry 1208 is configured to receive the current CSI values 1202*a* of the number of CSI values 1202. The transform/tap selection circuitry 1208 is further configured to apply at least one of a frequency domain or a spatial domain transform (e.g., a DFT) to the current CSI values 1202 to obtain a plurality of short-term coefficients 1210 (Coeff 1, Coeff 2, . . . Coeff M). Each of the short-term coefficients 1210 includes both amplitude and phase components. In this example, the current CSI values 1202*a* may include a plurality of subsets of CSI values (e.g., subsets of the plurality of sets of CSI values corresponding to the current CSI values 1202*a*). The transform/tap selection circuitry 1208 may apply a respective transform (e.g., a frequency domain or spatial domain transform) to each subset of CSI values to produce respective transform values. The transform/tap selection circuitry 1208 may then select a respective set of taps from each of the transform values to produce respective sets of coefficients. The transform/tap selection circuitry 1208 may then sort the sets of coefficients into respective groups of short-term coefficients. Each group of short-term coefficients includes corresponding coefficients that are corresponding in one of a frequency domain or a spatial domain over time. For example, the short-term coefficients 1210 shown in FIG. 12 may include coefficients representative of the current CSI values 1202*a* obtained based on the plurality of CSI-RSs (in time) and in one of a particular set of subcarrier frequencies (e.g., sub-band or wideband) or a particular spatial direction. In some examples, each of the short-term coefficients 1210 may correspond to one of the received CSI-RSs. For example, Coeff 1 may correspond to a short-term phase coefficient for CSI-RS 902*a* shown in FIG. 9, Coeff 2 may correspond to a short-term phase coefficient for CSI-RS 902*b*, and so on.

In examples in which the long-term distribution parameter (s) 1206 are based on at least one of a frequency domain or spatial domain transform, the transform/tap selection circuitry 1208 may be configured to produce both the short-term phase coefficients and the long-term amplitude coefficients. In this example, the long-term distribution function circuitry 1204 may be included as part of the transform/tap selection circuitry 1208. In addition, in this example, the groups of short-term coefficients 1210 may be considered sub-groups of coefficients from the groups of long-term coefficients determined based on the number of CSI values 1202. Here, the sub-groups of coefficients may each be associated with only the current CSI values 1202*a*.

The quantization circuitry 1212 is configured to quantize the short-term coefficients 1210. As indicated above, the short-term coefficients 1210 include both amplitude and phase components. Thus, the quantization circuitry 1208 is configured to separately quantize each of the amplitude components (referred to as amplitude coefficients) and phase components (referred to as phase coefficients) for each of the groups of short-term coefficients 1210. To quantize the short-term amplitude coefficients, the quantization circuitry 1212 may perform a quantization based on the distribution function produced by the long-term distribution function circuitry 1204 to produce a plurality of quantized amplitude coefficients 1214*a* (QAmp 1, QAmp 2, . . . QAmp M). For example, the quantization circuitry 1212 may utilize the long-term distribution function parameters 1206 to determine a quantization table for use in quantizing the short-term amplitude coefficients. The quantization circuitry 1212 may then quantize each of the short-term amplitude coefficients based on the quantization table to produce the plurality of quantized amplitude coefficients 1214*a*. In an example of a Gaussian PDF, the quantization table may be calculated as follows:

$$y_j = \frac{\int_{b_{j-1}}^{b_j} x f_x(x)dx}{\int_{b_{j-1}}^{b_j} f_x(x)dx} \quad \text{(Equation 4)}$$

$$b_j = \frac{y_{j+1} + y_j}{2}, \quad \text{(Equation 5)}$$

where b is the amplitude value (of the amplitude coefficient) and y is the quantized value.

For the phase coefficients, the quantization circuitry 1212 may determine a respective main (first) phase coefficient from each group of short-term phase coefficients 1210. In some examples, the main phase coefficient may be the first received short-term phase coefficient in the respective group of short-term phase coefficients. For example, the first phase coefficient may correspond to the phase coefficient associated with the first received CSI-RS. In other examples, the main phase coefficient may be the short-term phase coefficient with the highest or lowest value with respect to the other short-term phase coefficients in the respective group of short-term phase coefficients. It should be understood that any suitable criteria may be utilized by the quantization circuitry 1212 to identify the main phase coefficient. In some examples, an index of the main phase coefficient may be configured by the base station or pre-configured or determined by the UE (e.g., based on one or more criteria). For the latter, the UE may include the main phase coefficient index in the CSI report.

The quantization circuitry 1212 is further configured to calculate differential phase coefficients with respect to the main phase coefficient based on the remaining short-term phase coefficients 1210. In addition, the quantization circuitry 1212 is further configured to quantize the main (first) phase coefficient and each of the differential phase coefficients to produce a plurality of quantized phase coefficients 1214 (QMain Phase, QDiffPhase 1, . . . , QDiffPhase M) based on one or more pre-configured phase quantization tables. In some examples, the phase quantization table(s) may be pre-configured by the OEM (e.g., based on one or more 3GPP standards or specifications) or received from the base station.

In some examples, the quantization circuitry 1212 may apply a different phase quantization to each of the main phase coefficient and the differential phase coefficients. For example, the quantization circuitry 1212 may utilize Q1 (e.g., 3 bits) quantization for the main phase coefficient and Q2 (e.g., 2 bits) quantization for each of the differential phase coefficients.

The compression circuitry 1200 may then feedback both the long-term distribution parameter(s) 1206 and the plurality of short-term quantized coefficients (e.g., both the short-term quantized amplitude coefficients 1214*a* and the short-term quantized phase coefficients 1214*b*) as compressed channel information within a CSI report to the base station 1216. The base station 1216 may then use the long-term amplitude parameter(s) 1206 and short-term quantized coefficients 1214*a* and 1214*b* to reconstruct the channel and select an MCS, precoder, and rank for a DL data transmission to the UE.

Figure 13:
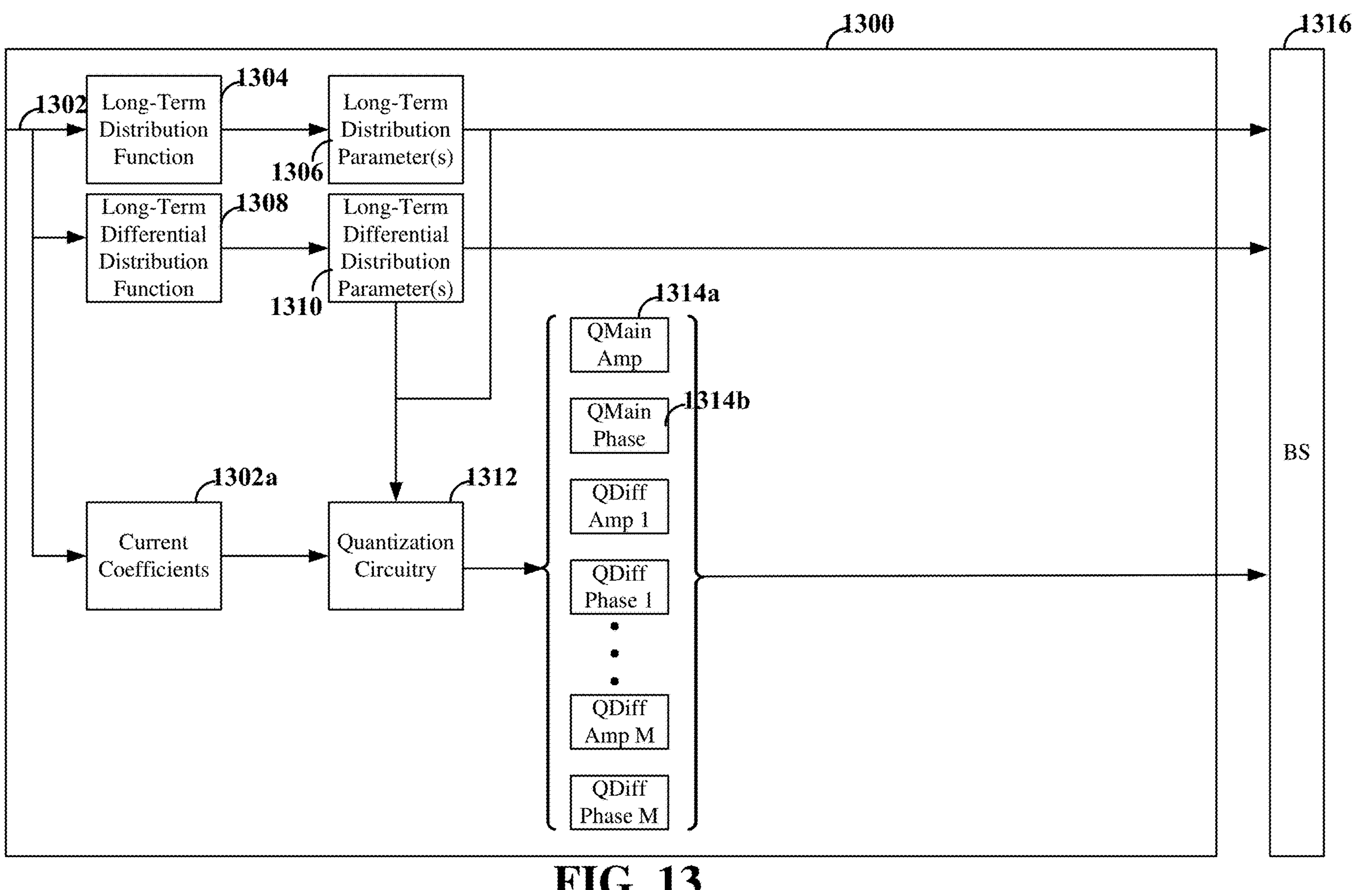
FIG. 13 is a diagram illustrating an example of distribution function circuitry configured to generate distribution function-based feedback for compressed channel information according to some aspects.

FIG. 13 is a diagram illustrating an example of distribution function circuitry 1300 within a UE configured to generate distribution function-based feedback for compressed channel information according to some aspects. The distribution function circuitry 1300 includes long-term distribution function circuitry 1304, long-term differential distribution function circuitry 1308, and quantization circuitry 1312.

In the example shown in FIG. 13, the distribution function circuitry 1300 is configured to receive, as input, a plurality of coefficients 1302 including current coefficients 1302*a* (e.g., the coefficients obtained based on the plurality of CSI-RSs 902*a*-902*d* shown in FIG. 9) and additional coefficients obtained prior to the current coefficients 1302*a*. The coefficients 1302 and current coefficients 1302*a* may be previously generated based on a number of CSI values, as described above in the example shown in FIG. 12. The number of coefficients 1302 and current coefficients 1302*a* (e.g., taps) may be pre-configured on the UE or may be configured by the base station, as described above. The coefficients 1302 and 1302*a* may be associated with a particular CSI type, such as RI, PMI, CQI, LI, etc. As described above in connection with FIGS. 10-12, the distribution function circuitry 1300 may be configured to separately process the coefficients 1302 for each CSI type (e.g., RI, PMI, CQI, LI, etc.).

The long-term distribution function circuitry 1304 is configured to receive the plurality of coefficients 1302 and to determine the amplitude components of the plurality of coefficients 1302 to produce long-term amplitude coefficients. The long-term distribution function circuitry 1304 is further configured to apply a distribution function to the plurality of long-term amplitude coefficients to determine at least one long-term distribution parameter 1306. In some examples, the plurality of coefficients 1302 correspond to a group of coefficients including coefficients corresponding in one of a frequency domain or a spatial domain across a set of reference signals (e.g., CSI-RSs) including a plurality of CSI-RSs associated with the current coefficients 1302*a*. In this example, the long-term distribution function circuitry 1304 may be configured to apply the distribution function to each of the long-term amplitude coefficients of each group of coefficients to separately produce respective long-term distribution parameters 1306. In some examples, the distribution function may be a PDF or a CDF.

The long-term differential distribution function circuitry 1308 is configured to determine long-term differential coefficients from the plurality of coefficients 1302 (e.g., from the plurality of long-term amplitude coefficients). For example, the plurality of long-term amplitude coefficients may include the set {C1, C2, C3, C4, . . . CN}. The long-term differential distribution function circuitry 1308 may determine the long-term differential coefficients as the set {C1-C2, C3-C4, . . .

CN−1-CN}. The long-term differential distribution function circuitry 1308 may then apply a distribution function (e.g., PDF/CDF) to the long-term differential coefficients to produce at least one long-term differential distribution parameter 1310. In some examples, the distribution function utilized by the long-term differential distribution function circuitry 1308 is the same as the distribution function utilized by the long-term distribution function circuitry 1304. In other examples, the distribution functions may differ between the long-term differential distribution function circuitry 1308 and the long-term distribution function circuitry 1304. In examples in which the plurality of coefficients 1302 correspond to a group of coefficients of a plurality of groups of coefficients, the long-term differential distribution function circuitry 1308 may be configured to apply the distribution function to each group of long-term amplitude coefficients to separately produce respective long-term differential distribution parameters 1310.

The quantization circuitry 1312 is configured to receive the current coefficients 1302*a* and to quantize the current (short-term) coefficients 1302*a*. As indicated above, the current coefficients 1302*a* include both amplitude and phase components. Thus, the quantization circuitry 1312 is configured to separately quantize each of the amplitude components (referred to as amplitude coefficients) and phase components (referred to as phase coefficients) for each of the groups of short-term coefficients 1302*a*. In some examples, the short-term coefficients (amplitude and phase) include sub-groups of short-term coefficients (e.g., across the frequency domain and/or spatial domain). To quantize the short-term amplitude coefficients, the quantization circuitry 1312 may perform a quantization based on the respective distribution functions produced by each of the long-term distribution function circuitry 1304 and the long-term differential distribution function circuitry 1308 to produce a plurality of quantized amplitude coefficients 1314*a* (QMain Amp, QDiffAmp 1, . . . QDiffAmp M).

For example, the quantization circuitry 1312 may determine a respective main (first) amplitude coefficient from each group of short-term phase coefficients (or sub-group of coefficients) 1302*a*, as described above. The quantization circuitry 1312 may then utilize the long-term distribution function parameters 1306 to determine a main (first) quantization table for use in quantizing the main amplitude coefficient to produce the QMainAmp. The quantization circuitry 1312 is further configured to calculate differential amplitude coefficients with respect to the main amplitude coefficient based on the remaining amplitude coefficients. The quantization circuitry 1312 may then utilize the long-term differential distribution function parameters 1310 to determine a second (additional) quantization table for use in quantizing the differential amplitude coefficients to produce the QDiffAmp 1 . . . . QDiffAmp M.

The quantization circuitry 1312 is further configured to determine a respective main (first) phase coefficient from each group of short-term coefficients (or sub-group of coefficients). In some examples, the main phase coefficient may be the first received short-term phase coefficient in the respective group of short-term coefficients. For example, the first phase coefficient may correspond to the phase coefficient associated with the first received CSI-RS. In other examples, the main phase coefficient may be the short-term phase coefficient with the highest or lowest value with respect to the other short-term phase coefficients in the respective group of short-term coefficients. It should be understood that any suitable criteria may be utilized by the differential phase quantization circuitry 1312 to identify the main phase coefficient. In some examples, an index of the main phase coefficient may be configured by the base station or pre-configured or determined by the UE (e.g., based on one or more criteria). For the latter, the UE may include the main phase coefficient index in the CSI report.

The differential phase quantization circuitry 1312 is further configured to calculate differential phase coefficients with respect to the first phase coefficient based on the remaining short-term phase coefficients. In addition, the differential phase quantization circuitry 1312 is further configured to quantize the main (first) phase coefficient and each of the differential phase coefficients to produce a plurality of quantized phase coefficients 1314*b* (QMain Phase, QDiffPhase 1, . . . , QDiffPhase M). In some examples, the quantization circuitry 1312 may apply a different quantization to each of the main phase coefficient and the differential phase coefficients. For example, the quantization circuitry 1312 may utilize Q1 (e.g., 3 bits) quantization for the main phase coefficient and Q2 (e.g., 2 bits) quantization for each of the differential phase coefficients.

The distribution function circuitry 1300 may then feedback the long-term distribution parameter(s) 1306, the long-term differential distribution parameter(s) 1310, and the quantized short-term coefficients (e.g., short-term quantized amplitude coefficients 1314*a* and short-term quantized phase coefficients 1314*b*) as compressed channel information within a CSI report to the base station 1316. The base station 1316 may then use the received CSI report to reconstruct the channel and select an MCS, precoder, and rank for a DL data transmission to the UE.

Figures 14A, 14B, 14C:
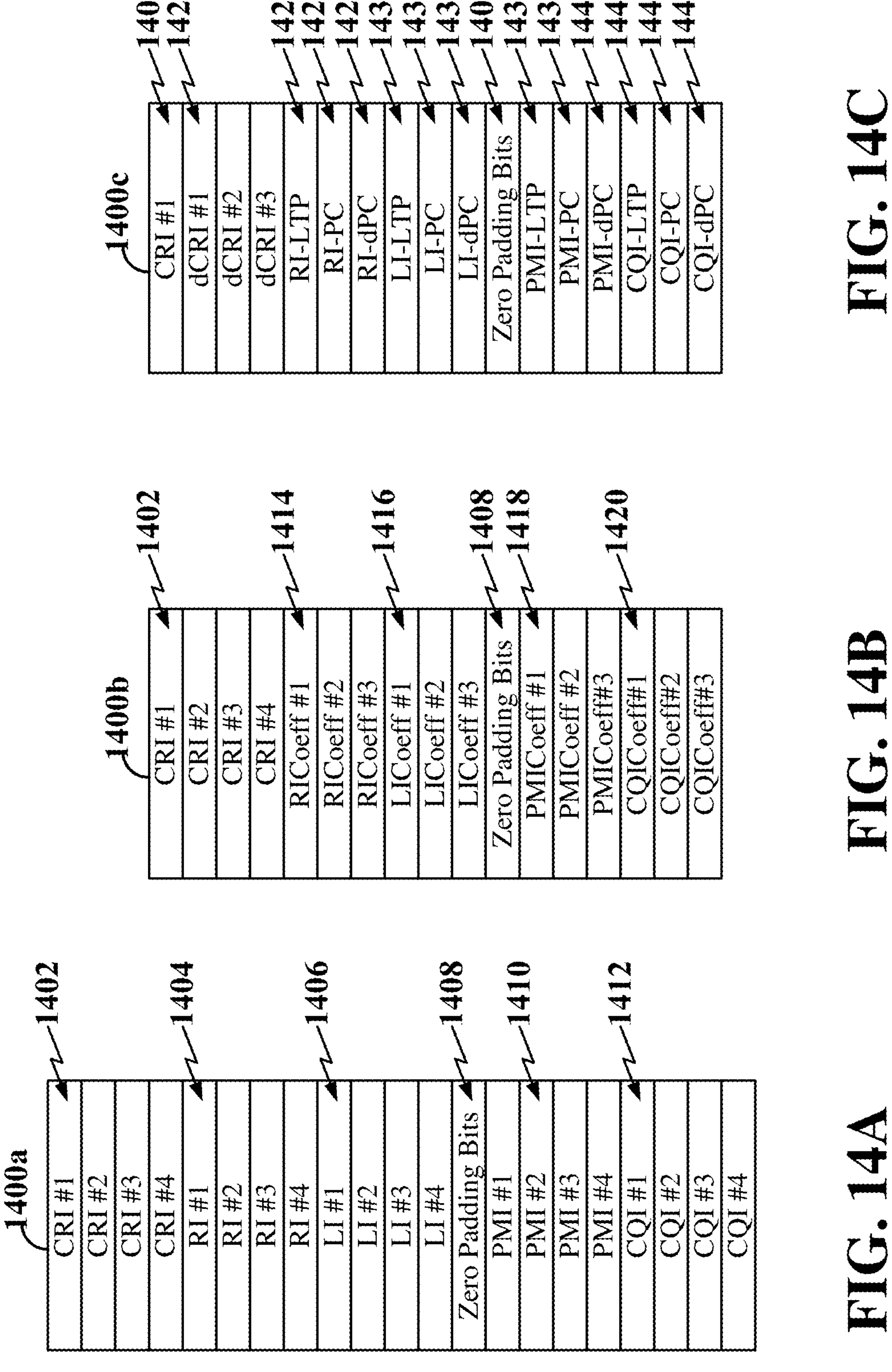
FIGS. 14A-14C are diagrams illustrating examples of CSI reports including time domain channel information according to some aspects.

FIGS. 14A-14C are diagrams illustrating examples of CSI reports 1400*a*, 1400*b*, and 1400*c* including time domain channel information according to some aspects. In the example shown in FIG. 14A, the time domain channel information in the CSI report 1400*a* includes a plurality of CRIs 1402 (e.g., CRI #1, CRI #2, CRI #3, and CRI #4), each identifying one of a plurality of CSI-RSs received over time. For example, each CSI-RS may be associated with a different time domain resource.

The time domain channel information further includes CSI values arranged in order of RI 1404, LI 1406, PMI 1410, and CQI 1412. In addition, zero padding bits 1408 may be included between the LI 1406 and the PMI 1410. The CSI values include a respective CSI value associated with each CRI 1402. For example, the RI values 1404 include RI #1 associated with CRI #1, RI #2 associated with CRI #2, RI #3 associated with CRI #3, and RI #4 associated with CRI #4. In addition, the LI values 1406 include LI #1 associated with CRI #1, LI #2 associated with CRI #2, LI #3 associated with CRI #3, and LI #4 associated with CRI #4. The PMI values 1410 include PMI #1 associated with CRI #1, PMI #2 associated with CRI #2, PMI #3 associated with CRI #3, and PMI #4 associated with CRI #4. Furthermore, the CQI values 1412 include CQI #1 associated with CRI #1, CQI #2 associated with CRI #2, CQI #3 associated with CRI #3, and CQI #4 associated with CRI #4. It should be understood that each of the CSI values shown in FIG. 14A may be representative of multiple CSI values across the frequency domain and/or spatial domain.

FIGS. 14B and 14C each illustrate CSI reports 1400*b* and 1400*c* including compressed channel information as part of the time domain channel information. In the example shown in FIG. 14B, the time domain channel information in the CSI report 1400*b* includes a plurality of CRIs 1402 (e.g., CRI #1, CRI #2, CRI #3, and CRI #4), each identifying one of a plurality of CSI-RSs received over time, similar to that shown in FIG. 14A.

In addition, the compressed channel information includes CSI coefficients produced as a result of a transform operation arranged in order of RI coefficients 1414, LI coefficients 1416, PMI coefficients 1418, and CQI coefficients 1420. Zero padding bits 1408 may also be included between the LI coefficients 1416 and the PMI coefficients 1418. The CSI coefficients may be quantized CSI coefficients, as described above. The CSI coefficients are collectively associated with the CRIs 1402. For example, the RI coefficients 1414 include RICoeff #1, RICoeff #2, and RICoeff #3 associated with CRI #1-CRI #4. In addition, the LI coefficients 1416 include LICoeff #1, LICoeff #2, and LICoeff #3 associated with CRI #1-CRI #4. The PMI coefficients 1418 include PMICoeff #1, PMICoeff #2, and PMICoeff #3 associated with CRI #1-CRI #4. Furthermore, the CQI coefficients 1420 include CQICoeff #1, CQICoeff #2, and CQICoeff #3 associated with CRI #1-CRI #4. It should be understood that the CSI coefficients shown in FIG. 14B may be representative of multiple CSI coefficients across the frequency domain and/or spatial domain.

In the example shown in FIG. 14C, the time domain channel information includes differential channel information. For each CSI type (e.g., CRI, RI, LI, PMI, and CQI), the time domain channel information includes a respective first entry and respective differential entries with respect to the first entry. For example, the differential channel information in the CSI report 1400*c* includes differential CRI information. For example, the CSI report 1400*c* may include a first CRI 1402 (CRI #1) and differential CRI information 1422 for each of the remaining CRIs (e.g., dCRI #1, dCRI #2, and dCRI #3), where the first CRI 1402 and the differential CRI information 1422 collectively identify a plurality of CSI-RSs received over time.

In addition, the compressed channel information also includes differential channel information. For example, the compressed channel information includes CSI amplitude/phase coefficients and differential CSI amplitude/phase coefficients produced as a result of a transform operation arranged in an order of an RI amplitude/phase coefficient (RI-PC) 1426 and one or more RI differential amplitude/phase coefficients (RI-dPC) 1428, an LI amplitude/phase coefficient (LI-PC) 1432 and one or more LI differential amplitude/phase coefficients (LI-dPC) 1434, a PMI amplitude/phase coefficient (PMI-PC) 1438 and one or more PMI differential amplitude/phase coefficients (PMI-dPC) 1440, and a CQI amplitude/phase coefficient (QCI-PC) 1444 and one or more CQI differential amplitude/phase coefficients (CQI-dPC) 1446. The CSI amplitude/phase coefficients (and differential CSI amplitude/phase coefficients) may each be quantized CSI coefficients, as described above. In addition, the amplitude coefficients (and any differential amplitude coefficients) may be quantized utilized quantization tables based on long-term distribution functions applied to a number of CSI values (or coefficients) associated with the plurality of CSI-RSs and additional CSI-RSs received prior to the plurality of CSI-RSs. It should be understood that the CSI phase coefficients shown in FIG. 14C may be representative of multiple CSI phase coefficients across the frequency domain and/or spatial domain.

The compressed channel information further includes at least one long-term parameter for each of the CSI types. For example, the long-term parameters include at least one RI long-term parameter (RI-LTP) 1424, at least one LI long-term parameter (LI-LTP) 1430, at least one PMI long-term parameter (PMI-LTP) 1436, and at least one CQI long-term parameter (CQI-LTP) 1442. In some examples, the long-term parameters are long-term amplitude parameters, as described above in connection with FIG. 11. In other examples, the long-term parameters include long-term distribution parameters, as described above in connection with FIGS. 12 and 13. In some examples, the compressed channel information may further include long-term differential distribution parameters, as described above in connection with FIG. 13.

Figure 15:
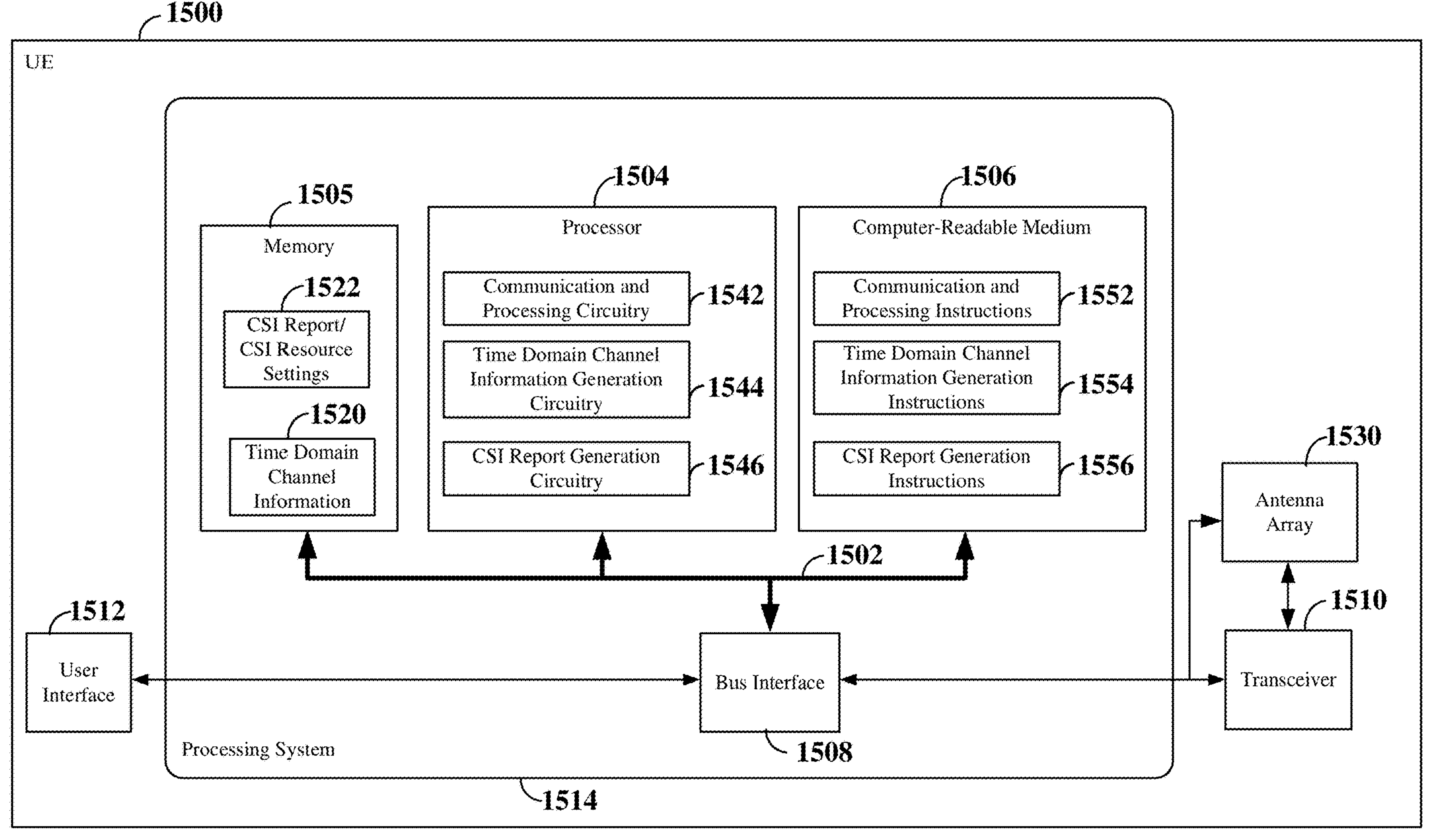
FIG. 15 is a block diagram illustrating an example of a hardware implementation for a UE employing a processing system according to some aspects.

FIG. 15 is a conceptual diagram illustrating an example of a hardware implementation for an exemplary UE 1500 employing a processing system 1514. For example, the UE 1500 may be any of the UEs or scheduled entities illustrated in any one or more of FIGS. 1, 2, 4-6 and/or 8-13.

The UE 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in a UE 1500, may be used to implement any one or more of the processes described below in connection with FIG. 15.

The processor 1504 may in some instances be implemented via a baseband or modem chip and in other implementations, the processor 1504 may itself include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a means for communicating with various other apparatus over a transmission medium (e.g., air interface). A user interface 1512 (e.g., keypad, display, speaker, microphone, joystick) may also be provided.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store time domain channel information 1520 and CSI Report/CSI Resource Settings 1522, which may be used by the processor 1504 in generating a CSI report.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. In some examples, the computer-readable medium 1506 may be part of the memory 1505. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1504 may include circuitry configured for various functions. For example, the processor 1504 may include communication and processing circuitry 1542, configured to communicate with a base station, such as a gNB or eNB via a Uu link. In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission).

In some implementations where the communication involves receiving information, the communication and processing circuitry 1542 may obtain information from a component of the UE 1500 (e.g., from the transceiver 1510 that receives the information via radio frequency signaling or some other type of signaling suitable for the applicable communication medium), process (e.g., decode) the information, and output the processed information. For example, the communication and processing circuitry 1542 may output the information to another component of the processor 1504, to the memory 1505, or to the bus interface 1508. In some examples, the communication and processing circuitry 1542 may receive one or more of signals, messages, other information, or any combination thereof. In some examples, the communication and processing circuitry 1542 may receive information via one or more channels. In some examples, the communication and processing circuitry 1542 may include functionality for a means for receiving. In some examples, the communication and processing circuitry 1542 may include functionality for a means for processing, including a means for demodulating, a means for decoding, etc.

In some implementations where the communication involves sending (e.g., transmitting) information, the communication and processing circuitry 1542 may obtain information (e.g., from another component of the processor 1504, the memory 1505, or the bus interface 1508), process (e.g., modulate, encode, etc.) the information, and output the processed information. For example, the communication and processing circuitry 1542 may output the information to the transceiver 1510 (e.g., that transmits the information via radio frequency signaling or some other type of signaling suitable for the applicable communication medium). In some examples, the communication and processing circuitry 1542 may send one or more of signals, messages, other information, or any combination thereof. In some examples, the communication and processing circuitry 1542 may send information via one or more channels. In some examples, the communication and processing circuitry 1542 may include functionality for a means for sending (e.g., a means for transmitting). In some examples, the communication and processing circuitry 1542 may include functionality for a means for generating, including a means for modulating, a means for encoding, etc.

In some examples, the communication and processing circuitry 1542 may be configured to receive at least one CSI report setting (and associated CSI resource setting) 1522 from the base station for use in generating CSI reports. In some examples, the CSI report/CSI resource settings 1522 may be received via, for example, RRC signaling. The CSI report setting may indicate the time domain channel information 1520 to include in a CSI report. The CSI resource setting may indicate the CRIs of CSI-RSs to be received by the UE 1500 over time to generate the time domain channel information. For example, each of the received CSI-RSs may be associated with a different time resource.

In addition, the communication and processing circuitry 1542 may be configured to receive and process downlink beamformed signals at a mmWave frequency or a sub-6 GHz frequency via the transceiver 1510 and an antenna array 1530. For example, the communication and processing circuitry 1542 may be configured to receive reference signals (e.g., CSI-RSs) on one or more downlink beams over time from the base station for channel state information (CSI) feedback in accordance with the CSI report setting and associated CSI resource setting. The communication and processing circuitry 1542 may further be configured to transmit a CSI report including time domain channel information 1520 to the base station. The communication and processing circuitry 1542 may further be configured to execute communication and processing instructions (software) 1552 stored on the computer-readable medium 1506 to implement one or more of the functions described herein.

The processor 1504 may further include time domain channel information generation circuitry 1544 configured to estimate a channel over time between the UE 1500 and the base station in accordance with the received CSIreport/CSI resource settings 1522 and to generate the time domain channel information 1520 based on the channel estimation. For example, the time domain channel information generation circuitry 1544 may be configured to measure the SINR of each received CSI-RS over time and generate a plurality of CSI values based on the measured SINR. The CSI values may include, for example, a CQI, RI, PMI, and/or LI for each CSI-RS. In some examples, the CSI values may further include multiple CSI values of each CSI type (e.g., RI, LI, PMI, and CQI) in the frequency domain and/or spatial domain. In some examples, the time domain channel information 1520 may include the plurality of CSI values.

In some examples, the time domain channel information 1520 may include compressed channel information based on the plurality of CSI values. In this example, the time domain channel information generation circuitry 1544 may include one or more of the compression circuitry 1000 shown in FIG. 10, the compression circuitry 1100 shown in FIG. 11, the compression circuitry 1200 shown in FIG. 12, or the distribution function circuitry 1300 shown in FIG. 13. For example, the time domain channel information generation circuitry 1544 may be configured to apply a time domain transform to the plurality of CSI values to produce a plurality of transform values. The time domain channel information generation circuitry 1544 may further be configured to select a plurality of taps from the plurality of transform values to produce a plurality of coefficients, and to quantize the coefficients to produce a plurality of quantized time domain coefficients. In this example, the compressed channel information of the time domain channel information 1520 may include both the quantized time domain coefficients and the respective indices of each of the taps.

In some examples, the time domain channel information generation circuitry 1544 may further be configured to apply at least one of a spatial domain transform or a frequency domain transform in addition to the time domain transform to the plurality of CSI values. For example, the time domain channel information generation circuitry 1544 may be configured to apply a spatial and/or frequency domain transform prior to the time domain transform or after the time domain transform to produce additional quantized coefficients to be included in the time domain channel information 1520. The compressed channel information of the time domain channel information 1520 may include the quantized time domain coefficients and the additional quantized coefficients, along with their respective tap indices.

In some examples, the time domain channel information generation circuitry 1544 may be configured to apply a respective time domain transform to a respective set of the plurality of CSI values for each sub-band of a plurality of sub-bands. The time domain transform may be the same or different between the sub-bands.

In some examples, the plurality of coefficients include both amplitude and phase coefficients. For example, the time domain channel information generation circuitry 1544 may determine the amplitude component and phase component of each of the plurality of coefficients to produce the amplitude coefficients and phase coefficients, respectively.

In some examples, the time domain channel information generation circuitry 1544 may determine a main (or first) phase coefficient and a plurality of differential phase coefficients generated from the remaining phase coefficients with respect to the main coefficient. In some examples, the time domain channel information generation circuitry 1544 may use different quantization types for each of the main phase coefficient and the differential phase coefficients. For example, the time domain channel information generation circuitry 1544 may use Q1 quantization for the main phase coefficient and Q2 quantization for each of the differential phase coefficients. The compressed channel information of the time domain channel information 1520 may include the main phase coefficient and the differential phase coefficients (e.g., for each of the CSI types and/or for each of the frequency spans (e.g., sub-band/wideband) and/or for each of the spatial directions).

In some examples, the time domain channel information generation circuitry 1544 may further be configured to determine at least one long-term amplitude parameter from a number of CSI values including the plurality of CSI values and additional CSI values obtained prior to the plurality of CSI values (e.g., based on prior received CSI-RSs). In some examples, the long-term amplitude parameter(s) may include an average of the amplitudes of the number of CSI values. In other examples, the time domain channel information generation circuitry 1544 may apply at least a time domain transform (e.g., a DFT) to the number of CSI values to obtain a plurality of long-term coefficients. In this example, the long-term amplitude parameter(s) may include the long-term amplitude coefficients, along with the indices of the taps (e.g., selected transform values) of the long-term amplitude coefficients. In other examples, the time domain channel information generation circuitry 1544 may apply a different function or filter to the number of CSI values 1102 to produce the long-term amplitude parameter(s). The compressed channel information of the time domain channel information 1520 may include the long-term amplitude parameter(s).

In some examples, the time domain channel information generation circuitry 1544 may be configured to obtain a plurality of sets of CSI values, each associated with a respective reference signal of a set of reference signals including the plurality of reference signals and additional reference signals received prior to the plurality of reference signals. The time domain channel information generation circuitry 1544 may then be configured to apply a respective transform to each set of CSI values to produce respective sets of transform values. In addition, the time domain channel information generation circuitry 1544 may be configured to select a respective set of taps from each of the sets of transform values to produce respective sets of coefficients and to sort the sets of coefficients into groups of coefficients, where each group includes coefficients corresponding in one of a spatial domain or frequency domain across the set of reference signals. For each group of coefficients, the time domain channel information generation circuitry 1544 may be configured to apply a distribution function to determine at least one long-term distribution parameter. The compressed channel information of the time domain channel information 1520 may include the at least one long-term distribution parameter for each of the groups of coefficients.

In addition, the time domain channel information generation circuitry 1544 may further be configured to identify a plurality of sub-groups of coefficients from the groups of coefficients. Each of the sub-groups may be associated with only the plurality of reference signals (e.g., excluding the additional reference signals received prior to the plurality of reference signals). For each of the sub-groups of coefficients, the time domain channel information generation circuitry 1544 may be configured to quantize the plurality of amplitude coefficients in the respective sub-group of coefficients utilizing a quantization based on the at least one long-term distribution parameter to produce a plurality of quantized amplitude coefficients. The time domain channel information generation circuitry 1544 may further be configured to quantize a first (main) coefficient (e.g., a phase coefficient) to produce a first quantized coefficient. In addition, the time domain channel information generation circuitry 1544 may be configured to determine a plurality of differential coefficients with respect to the first coefficient from the remaining coefficients in the sub-group and to quantize the plurality of differential coefficients to produce a plurality of quantized differential coefficients. The compressed channel information of the time domain channel information 1520 may include the plurality of quantized amplitude coefficients, the first quantized coefficient and the plurality of quantized differential coefficients for each of the sub-groups of coefficients.

In some examples, for each of the groups of coefficients, the time domain channel information generation circuitry 1544 may further determine respective long-term differential coefficients from the group of coefficients and apply an additional distribution function to the respective long-term differential coefficients to determine at least one long-term differential distribution parameter. The compressed channel information of the time domain channel information 1520 may further include the at least one long-term differential distribution parameter.

In addition, for each of the sub-groups of coefficients, the time domain channel information generation circuitry 1544 may quantize a first amplitude coefficient of the plurality of amplitude coefficients in the respective sub-group of coefficients utilizing the quantization based on the at least one long-term distribution parameter to produce a first quantized amplitude coefficient. The time domain channel information generation circuitry 1544 may further determine a plurality of differential amplitude coefficients with respect to the first amplitude coefficient based on remaining amplitude coefficients of the plurality of amplitude coefficients in the respective sub-group of coefficients to produce a plurality of quantized differential amplitude coefficients. The time domain channel information generation circuitry 1544 may then quantize the differential amplitude coefficients utilizing an additional quantization based on the at least one long-term differential distribution parameter. The compressed channel information of the time domain channel information may further include the first quantized amplitude coefficient and the plurality of quantized differential amplitude coefficients. The time domain channel information generation circuitry 1544 may further be configured to execute time domain channel information generation instructions (software) 1554 stored on the computer-readable medium 1506 to implement one or more of the functions described herein.

The processor may further include CSI report generation circuitry 1546 configured to generate a CSI report including the time domain channel information 1520. In some examples, the time domain channel information 1520 includes a respective set of CSI values for each of a plurality of CSI types including a channel state information reference signal (CSI-RS) resource indicator (CRI), a rank indicator, a layer indicator (LI), a precoding matrix indicator (PMI), and a channel quality indicator (CQI). In some examples, the time domain channel information 1520 is arranged in the CSI report in an order corresponding to the CRI, the RI, the LI, zero padding, the PMI, and the CQI. In some examples, the time domain channel information includes a respective first entry for each of the plurality of CSI types and respective differential entries with respect to the respective first entry for each of the plurality of CSI types.

The CSI report generation circuitry 1546 may further be configured to operate together with the communication and processing circuitry 1542 and transceiver 1510 to transmit the CSI report to the base station. The CSI report generation circuitry 1546 may further be configured to execute CSI report generation instructions (software) 1556 stored on the computer-readable medium 1506 to implement one or more of the functions described herein.

Figure 16:
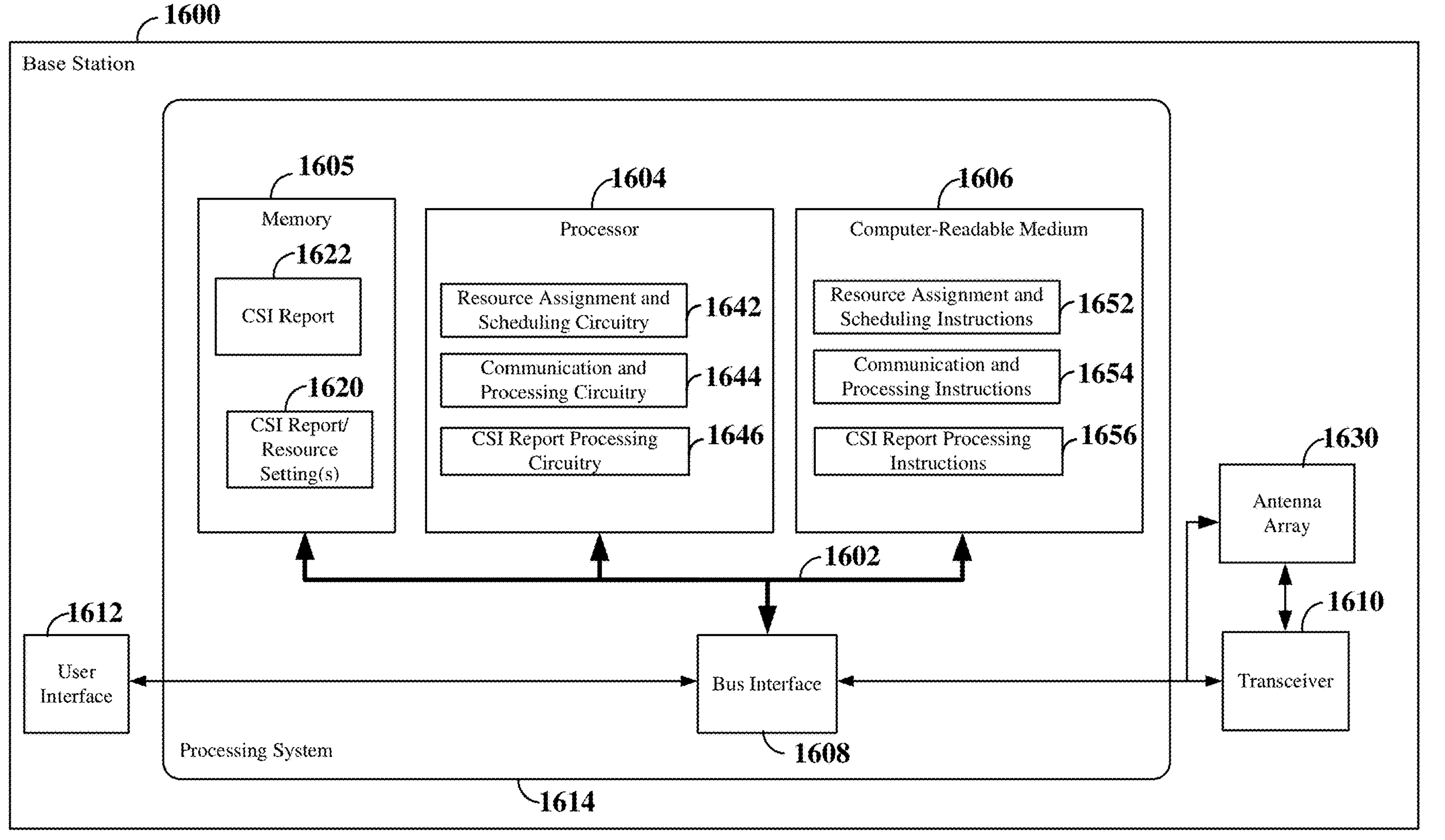
FIG. 16 is a block diagram illustrating an example of a hardware implementation for a base station employing a processing system according to some aspects.

FIG. 16 is a conceptual diagram illustrating an example of a hardware implementation for an exemplary base station 1600 employing a processing system 1614. For example, the base station 1600 may be any of the base stations or scheduling entities illustrated in any one or more of FIGS. 1, 2, 4-6, 8 and/or 9.

In accordance with various aspects of the disclosure, an element, or any portion of an element, or any combination of elements may be implemented with a processing system 1614 that includes one or more processors 1604. The processing system 1614 may be substantially the same as the processing system 1514 illustrated in FIG. 15, including a bus interface 1608, a bus 1602, memory 1605, a processor 1604, and a computer-readable medium 1606. Furthermore, the base station 1600 may include an optional user interface 1612 and a transceiver 1610 substantially similar to those described above in FIG. 15. That is, the processor 1604, as utilized in a base station 1600, may be used to implement any one or more of the processes described below.

In some aspects of the disclosure, the processor 1604 may include circuitry configured for various functions. For example, the processor 1604 may include resource assignment and scheduling circuitry 1642, configured to generate, schedule, and modify a resource assignment or grant of time-frequency resources (e.g., a set of one or more resource elements). For example, the resource assignment and scheduling circuitry 1642 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1642 may be configured to schedule resources for the transmission of at least one CSI report setting (and associated CSI resource setting) 1620 to a UE for use in generating a CSI report 1622. The CSI report setting(s) (and associated CSI resource setting(s)) 1620 may be stored, for example, in memory 1605. In some examples, the CSI report/resource setting(s) 1620 may be transmitted via, for example, RRC signaling. The CSI report setting may indicate time domain channel information to include in the CSI report. The CSI resource setting may indicate the CRIs of CSI-RSs to be transmitted to the UE over time to generate the time domain channel information. For example, each of the CSI-RSs may be associated with a different time resource.

In addition, the resource assignment and scheduling circuitry 1642 may be configured to schedule resources for the transmission of one or more downlink reference signals (e.g., CSI-RS) via one or more downlink beamformed signals at a mmWave frequency or a sub-6 GHz frequency. The resource assignment and scheduling circuitry 1642 may further be configured to schedule resources for an uplink transmission of a CSI report 1622 from the UE. For example, the CSI report may be generated based on a CSI report setting 1620 for time domain channel information configured on the UE.

The resource assignment and scheduling circuitry 1642 may further be configured to schedule at least one downlink data transmission to the UE based on the CSI report 1622 (e.g., time domain channel information included in the CSI report). For example, the resource assignment and scheduling circuitry 1642 may select one or more of a rank, precoding matrix, or MCS based on the CSI report 1622. The resource assignment and scheduling circuitry 1642 may further be configured to execute resource assignment and scheduling instructions (software) 1652 stored on the computer-readable medium 1606 to implement one or more of the functions described herein.

The processor 1604 may further include communication and processing circuitry 1644, configured to transmit at least one CSI report setting (and associated CSI resource setting) 1620 to the UE. The communication and processing circuitry 1644 may further be configured to generate and transmit downlink beamformed signals at a mmWave frequency or a sub-6 GHz frequency via the transceiver 1610 and an antenna array 1630. For example, the communication and processing circuitry 1644 may be configured to transmit a respective reference signal (e.g., CSI-RS) on one or more downlink beams to the UE for channel state information (CSI) feedback in accordance with a CSI report setting and associated CSI resource setting 1620.

The communication and processing circuitry 1644 may further be configured to receive a CSI report 1622 from the UE and to store the CSI report 1622 within, for example, memory 1605. The communication and processing circuitry 1644 may further be configured to execute communication and processing instructions (software) 1654 stored on the computer-readable medium 1606 to implement one or more of the functions described herein.

The processor 1604 may further include CSI report processing circuitry 1646, configured to process the CSI report 1622. In some examples, the CSI report processing circuitry 1646 may be configured to process time domain channel information included in the CSI report 1622. The time domain channel information may be based on a plurality of CSI values obtained based on the plurality of reference signals (e.g., CSI-RSs) indicated in the CSI report/resource setting 1620 configured on the UE. In some examples, the time domain channel information may include the plurality of CSI values. For example, the plurality of CSI values may include a respective set of CSI values for each of a plurality of CSI types, including a channel state information reference signal (CSI-RS) resource indicator (CRI), a rank indicator, a layer indicator (LI), a precoding matrix indicator (PMI), and a channel quality indicator (CQI). In some examples, the time domain channel information is arranged in the CSI report in an order corresponding to the CRI, the RI, the LI, zero padding, the PMI, and the CQI. In some examples, the time domain channel information includes a respective first entry for each of the plurality of CSI types and respective differential entries with respect to the respective first entry for each of the plurality of CSI types.

In some examples, the time domain channel information may include compressed channel information based on the plurality of CSI values. The CSI report processing circuitry 1646 may further be configured to reconstruct the plurality of CSI values based on the compressed channel information and provide the CSI values to the resource assignment and scheduling circuitry 1642 for scheduling downlink data transmissions to the UE based on the plurality of CSI values.

For example, the compressed channel information may include a main quantized phase coefficient, quantized differential phase coefficients, and at least one long-term amplitude parameter based on a number of CSI values including the plurality of CSI values and additional CSI values obtained prior to the plurality of CSI values. As another example, the compressed channel information may include a first quantized phase coefficient, quantized differential phase coefficients that are differential with respect to the first quantized phase coefficient, at least one long-term distribution parameter of a distribution function applied to a plurality of long-term amplitude coefficients obtained from a set of reference signals including the plurality of reference signals and additional reference signals transmitted prior to the plurality of reference signals, and a plurality of quantized short-term amplitude coefficients associated with the plurality of reference signals that are quantized based on the at least one long-term distribution parameter.

In some examples, the compressed channel information further includes at least one long-term differential distribution parameter of an additional distribution function applied to long-term differential amplitude coefficients obtained from the plurality of long-term amplitude coefficients. In this example, the plurality of quantized short-term amplitude coefficients may include a first quantized short-term amplitude coefficient quantized based on the at least one long-term distribution parameter and a plurality of quantized differential coefficients that are differential with respect to the first quantized coefficient and quantized based on the at least one long-term differential distribution parameter. The CSI report processing circuitry 1646 may further be configured to execute CSI report processing instructions (software) 1656 stored on the computer-readable medium 1606 to implement one or more of the functions described herein.

Figure 17:
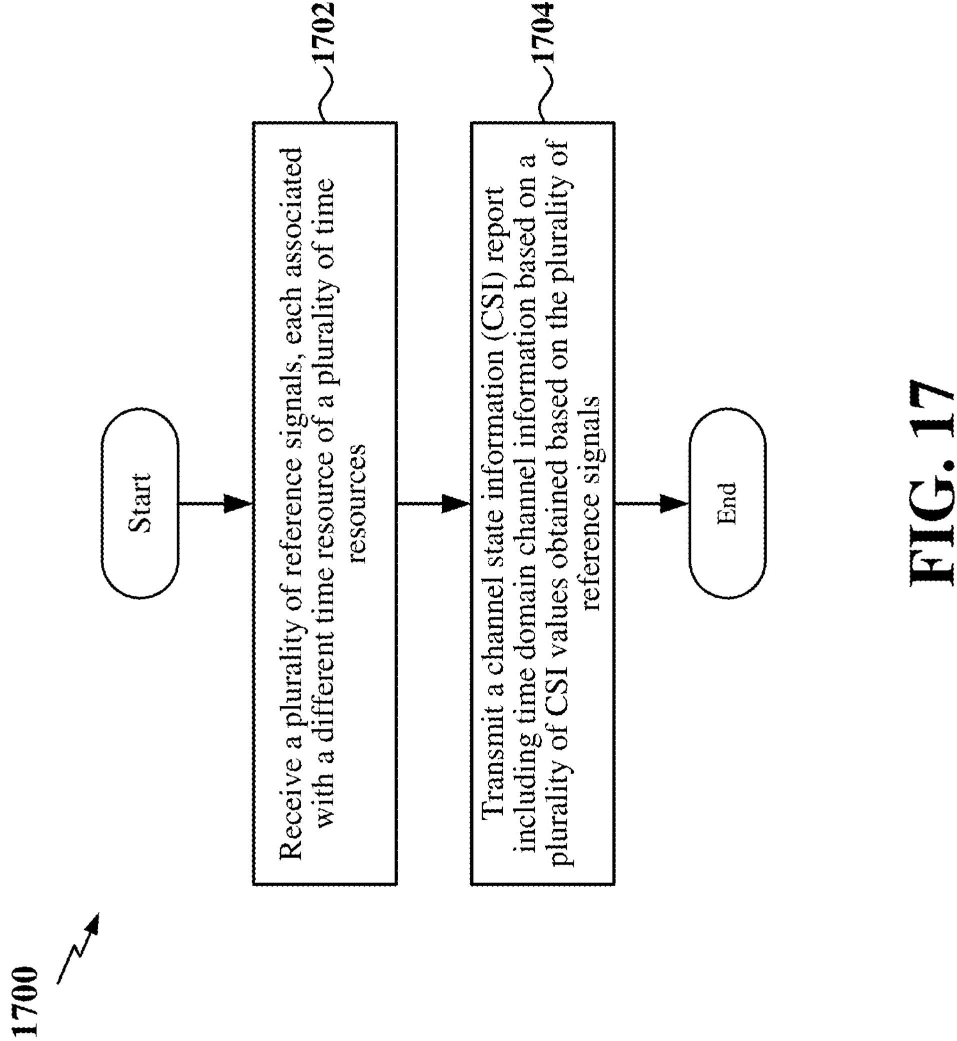
FIG. 17 is a flow chart of an exemplary method for transmitting time domain channel information within a CSI report according to some aspects.

FIG. 17 is a flow chart illustrating an example of a method 1700 for transmitting time domain channel information within a CSI report according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 1702, the UE may receive a plurality of reference signals, each associated with a different time resource of a plurality of time resources. The plurality of reference signals may include, for example, CSI-RSs. For example, the communication and processing circuitry 1542 and transceiver 1510 shown and described above in connection with FIG. 15 may provide a means to receive the plurality of reference signals.

At block 1704, the UE may transmit a channel state information (CSI) report including time domain channel information based on a plurality of CSI values obtained based on the plurality of reference signals. In some examples, the time domain channel information includes the plurality of CSI values. In other examples, the time domain channel information includes compressed channel information based on the plurality of CSI values. For example, the UE may apply a time domain transform to the plurality of CSI values to produce a plurality of transform values. The UE may then select a plurality of taps from the plurality of transform values to produce a plurality of coefficients. The UE may then quantize the plurality of coefficients to produce a plurality of quantized time domain coefficients. The compressed channel information may include the plurality of quantized time domain coefficients and respective indices of each of the plurality of taps.

In some examples, the UE may further apply at least one of a spatial domain transform or a frequency domain transform to the plurality of quantized time domain coefficients to produce additional quantized coefficients. In this example, the compressed channel information further includes the additional quantized coefficients. In some examples, the UE may apply at least one of a spatial domain transform or a frequency domain transform prior to the time domain transform to produce additional quantized coefficients. In this example, the compressed channel information further includes the additional quantized coefficients.

In some examples, the plurality of CSI values include a respective set of CSI values for each sub-band of a plurality of sub-bands, and the UE may apply the time domain transform to each of the respective sets of CSI values. In this example, the UE may apply a different time domain transform to at least two of the respective sets of CSI values.

In some examples, the plurality of coefficients include a main phase coefficient and a plurality of differential coefficients with respect to the main phase coefficient. In this example, the UE may further determine at least one long-term amplitude parameter from a number of CSI values including the plurality of CSI values and additional CSI values obtained prior to the plurality of CSI values. Here, the time domain channel information further includes the at least one long-term amplitude parameter. In some examples, the UE may quantize the main phase coefficient using a first quantization type to produce a main quantized phase coefficient. The UE may further quantize the plurality of differential phase coefficients using a second quantization type to produce a plurality of quantized differential phase coefficients. Here, the compressed channel information includes the main quantized phase coefficient and the quantized differential phase coefficients. In some examples, the first quantization type is different than the second quantization type.

In some examples, the UE may obtain a plurality of sets of CSI values, each associated with a respective reference signal of a set of reference signals including the plurality of reference signals and additional reference signals received prior to the plurality of reference signals. The UE may further apply a respective transform to each set of CSI values of the plurality of sets of CSI values to produce respective sets of transform values and select a respective set of taps from each of the sets of transform values to produce respective sets of coefficients. The UE may further sort the sets of coefficients into groups of coefficients. Each group of coefficients may include corresponding coefficients across the set of reference signals. The corresponding coefficients may be corresponding in one of a frequency domain or spatial domain. For each of the groups of coefficients, the UE may further apply a distribution function to determine at least one long-term distribution parameter. In this example, the compressed channel information includes the at least one long-term distribution parameter for each of the groups of coefficients.

The UE may further identify a plurality of sub-groups of coefficients from the groups of coefficients. Each of the plurality of sub-groups of coefficients may be associated with the plurality of reference signals. For each of the plurality of sub-groups of coefficients including both a plurality of amplitude coefficients and a plurality of phase coefficients, the UE may further quantize the plurality of amplitude coefficients in the respective sub-group of coefficients utilizing a quantization based on the at least one long-term distribution parameter to produce a plurality of quantized amplitude coefficients. In addition, the UE may quantize a first phase coefficient of the plurality of phase coefficients in the respective sub-group of coefficients to produce a first quantized phase coefficient, determine a plurality of differential phase coefficients with respect to the first phase coefficient from remaining phase coefficients of the plurality of phase coefficients in the respective sub-group of coefficients, and quantize the plurality of differential phase coefficients to produce a plurality of quantized differential phase coefficients. In this example, the compressed channel information includes the plurality of quantized amplitude coefficients, the first quantized phase coefficient and the plurality of quantized differential phase coefficients for each of the plurality of sub-groups of coefficients.

For each of the groups of coefficients, the UE may further determine respective long-term differential coefficients and apply an additional distribution function to the respective long-term differential coefficients to determine at least one long-term differential distribution parameter. In this example, the compressed channel information further includes the at least one long-term differential distribution parameter. In some examples, the UE may quantize the plurality of amplitude coefficients in the respective sub-group of coefficients by quantizing a first amplitude coefficient of the plurality of amplitude coefficients in the respective sub-group of coefficients utilizing the quantization based on the at least one long-term distribution parameter to produce a first quantized amplitude coefficient, determine a plurality of differential amplitude coefficients with respect to the first amplitude coefficient based on remaining amplitude coefficients of the plurality of amplitude coefficients in the respective sub-group of coefficients to produce a plurality of quantized differential amplitude coefficients, and quantize the differential amplitude coefficients utilizing an additional quantization based on the at least one long-term differential distribution parameter. In this example, the compressed channel information further includes the first quantized amplitude coefficient and the plurality of quantized differential amplitude coefficients.

In some examples, the plurality of CSI values include a respective set of CSI values for each of a plurality of CSI types including a channel state information reference signal (CSI-RS) resource indicator (CRI), a rank indicator, a layer indicator (LI), a precoding matrix indicator (PMI), and a channel quality indicator (CQI). In this example, the time domain channel information is arranged in the CSI report in an order corresponding to the CRI, the RI, the LI, zero padding, the PMI, and the CQI. In some examples, the time domain channel information further includes a respective first entry for each of the plurality of CSI types and respective differential entries with respect to the respective first entry for each of the plurality of CSI types. For example, the communication and processing circuitry 1542, together with the time domain channel information generation circuitry 1544, CSI report generation circuitry 1546 and transceiver 1510, shown and described above in connection with FIG. 15 may provide a means to transmit the CSI report to the base station.

Figure 18:
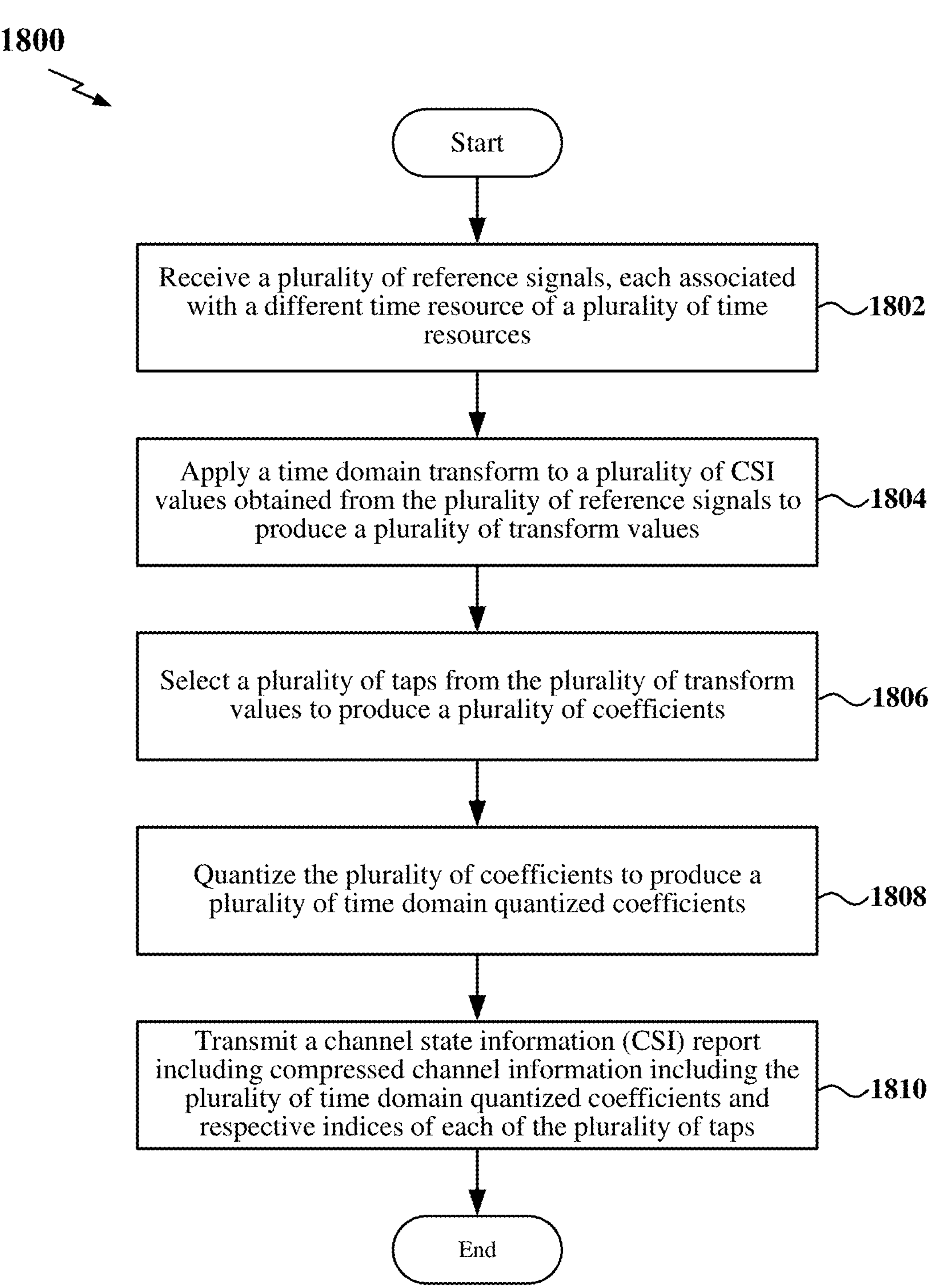
FIG. 18 is a flow chart of another exemplary method for transmitting time domain channel information within a CSI report according to some aspects.

FIG. 18 is a flow chart illustrating another example of a method 1800 for transmitting time domain channel information within a CSI report according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 1802, the UE may receive a plurality of reference signals, each associated with a different time resource of a plurality of time resources. The plurality of reference signals may include, for example, CSI-RSs. For example, the communication and processing circuitry 1542 and transceiver 1510 shown and described above in connection with FIG. 15 may provide a means to receive the plurality of reference signals.

At block 1804, the UE may apply a time domain transform to a plurality of CSI values obtained from the plurality of reference signals to produce a plurality of transform values. For example, the time domain transform may be a DFT or DCT. In some examples, the plurality of CSI values include a respective set of CSI values for each sub-band of a plurality of sub-bands, and the UE may apply the time domain transform to each of the respective sets of CSI values. In this example, the UE may apply a different time domain transform to at least two of the respective sets of CSI values. For example, the time domain channel information generation circuitry 1544 shown and described above in connection with FIG. 15 may provide a means to apply the time domain transform.

At block 1806, the UE may select a plurality of taps from the plurality of transform values to produce a plurality of coefficients. In some examples, the number of taps may be pre-configured on the UE or configured by the base station. For example, the time domain channel information generation circuitry 1544 shown and described above in connection with FIG. 15 may provide a means to select the plurality of taps.

At block 1808, the UE may quantize the plurality of coefficients to produce a plurality of quantized time domain coefficients. In some examples, the UE may further apply at least one of a spatial domain transform or a frequency domain transform to the plurality of quantized time domain coefficients to produce additional quantized coefficients. In some examples, the UE may apply at least one of a spatial domain transform or a frequency domain transform prior to the time domain transform to produce additional quantized coefficients. For example, the time domain channel information generation circuitry 1544 shown and described above in connection with FIG. 15 may provide a means to quantize the plurality of coefficients.

At block 1810, the UE may transmit a channel state information (CSI) report including compressed channel information including the plurality of quantized time domain coefficients and respective indices of each of the plurality of taps. For example, the communication and processing circuitry 1542, together with the CSI report generation circuitry 1546 and transceiver 1510, shown and described above in connection with FIG. 15 may provide a means to transmit the CSI report to the base station.

Figure 19:
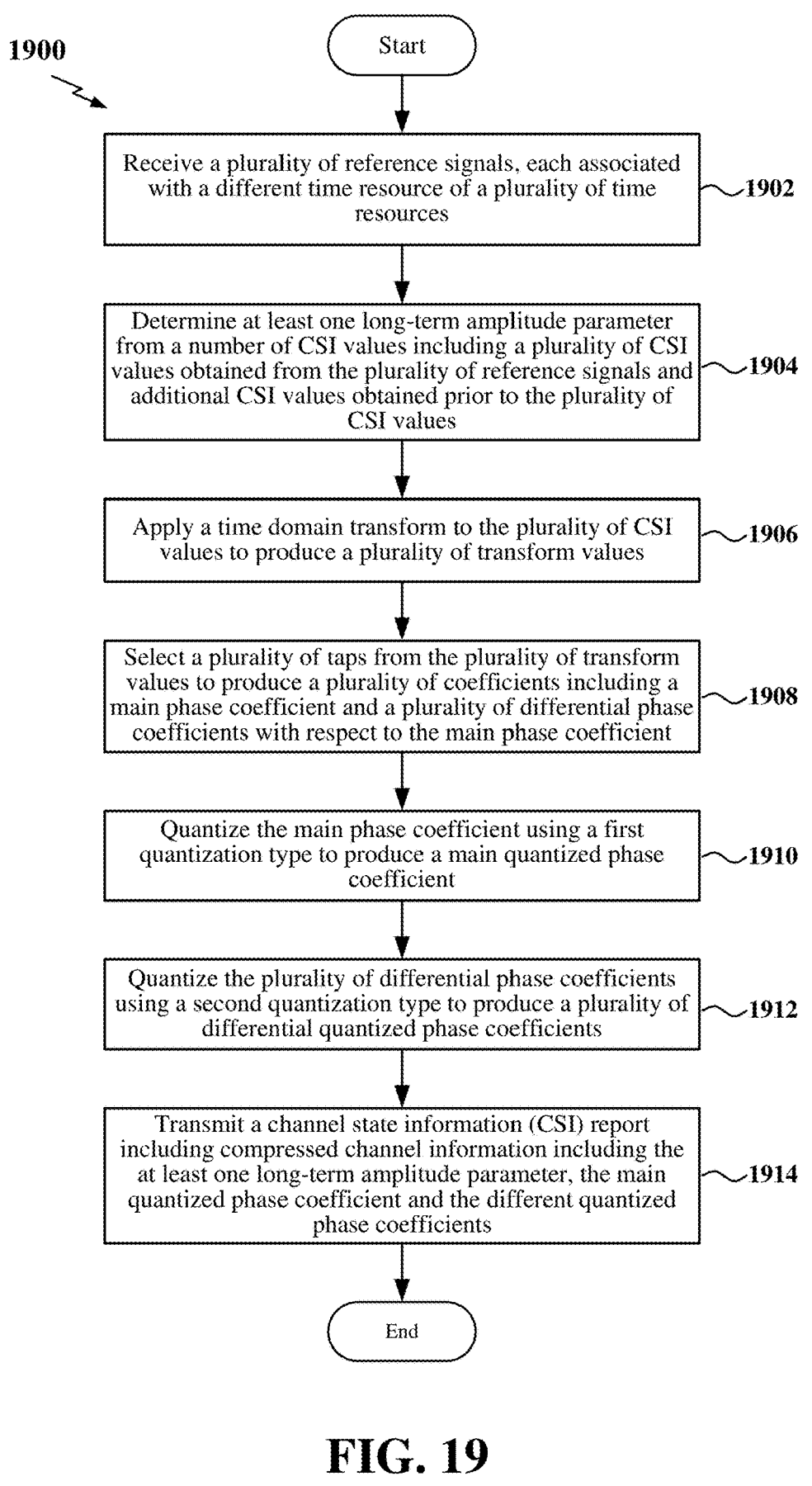

FIG. 19 is a flow chart illustrating another example of a method 1900 for transmitting time domain channel information within a CSI report according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 1902, the UE may receive a plurality of reference signals, each associated with a different time resource of a plurality of time resources. The plurality of reference signals may include, for example, CSI-RSs. For example, the communication and processing circuitry 1542 and transceiver 1510 shown and described above in connection with FIG. 15 may provide a means to receive the plurality of reference signals.

At block 1904, the UE may determine at least one long-term amplitude parameter from a number of CSI values including a plurality of CSI values obtained from the plurality of reference signals and additional CSI values obtained prior to the plurality of CSI values. For example, the time domain channel information generation circuitry 1544 shown and described above in connection with FIG. 15 may provide a means to determine the at least one long-term amplitude parameter.

At block 1906, the UE may apply a time domain transform to a plurality of CSI values obtained from the plurality of reference signals to produce a plurality of transform values. For example, the time domain transform may be a DFT or DCT. For example, the time domain channel information generation circuitry 1544 shown and described above in connection with FIG. 15 may provide a means to apply the time domain transform.

At block 1908, the UE may select a plurality of taps from the plurality of transform values to produce a plurality of coefficients including a main phase coefficient and a plurality of differential phase coefficients with respect to the main phase coefficient. In some examples, the number of taps may be pre-configured on the UE or configured by the base station. For example, the time domain channel information generation circuitry 1544 shown and described above in connection with FIG. 15 may provide a means to select the plurality of taps.

At block 1910, the UE may quantize the main phase coefficient using a first quantization type to produce a main quantized phase coefficient. For example, the time domain channel information generation circuitry 1544 shown and described above in connection with FIG. 15 may provide a means to quantize the main phase coefficient.

At block 1912, the UE may quantize the plurality of differential phase coefficients using a second quantization type to produce a plurality of differential quantized phase coefficients. In some examples, the first quantization type is different than the second quantization type. For example, the first quantization type may be Q1 quantization, while the second quantization type may be Q2 quantization. For example, the time domain channel information generation circuitry 1544 shown and described above in connection with FIG. 15 may provide a means to quantize the plurality of differential phase coefficients.

At block 1914, the UE may transmit a channel state information (CSI) report including compressed channel information including the at least one long-term amplitude parameter, the main quantized phase coefficient and the different quantized phase coefficients. For example, the communication and processing circuitry 1542, together with the CSI report generation circuitry 1546 and transceiver 1510, shown and described above in connection with FIG. 15 may provide a means to transmit the CSI report to the base station.

Figure 20:
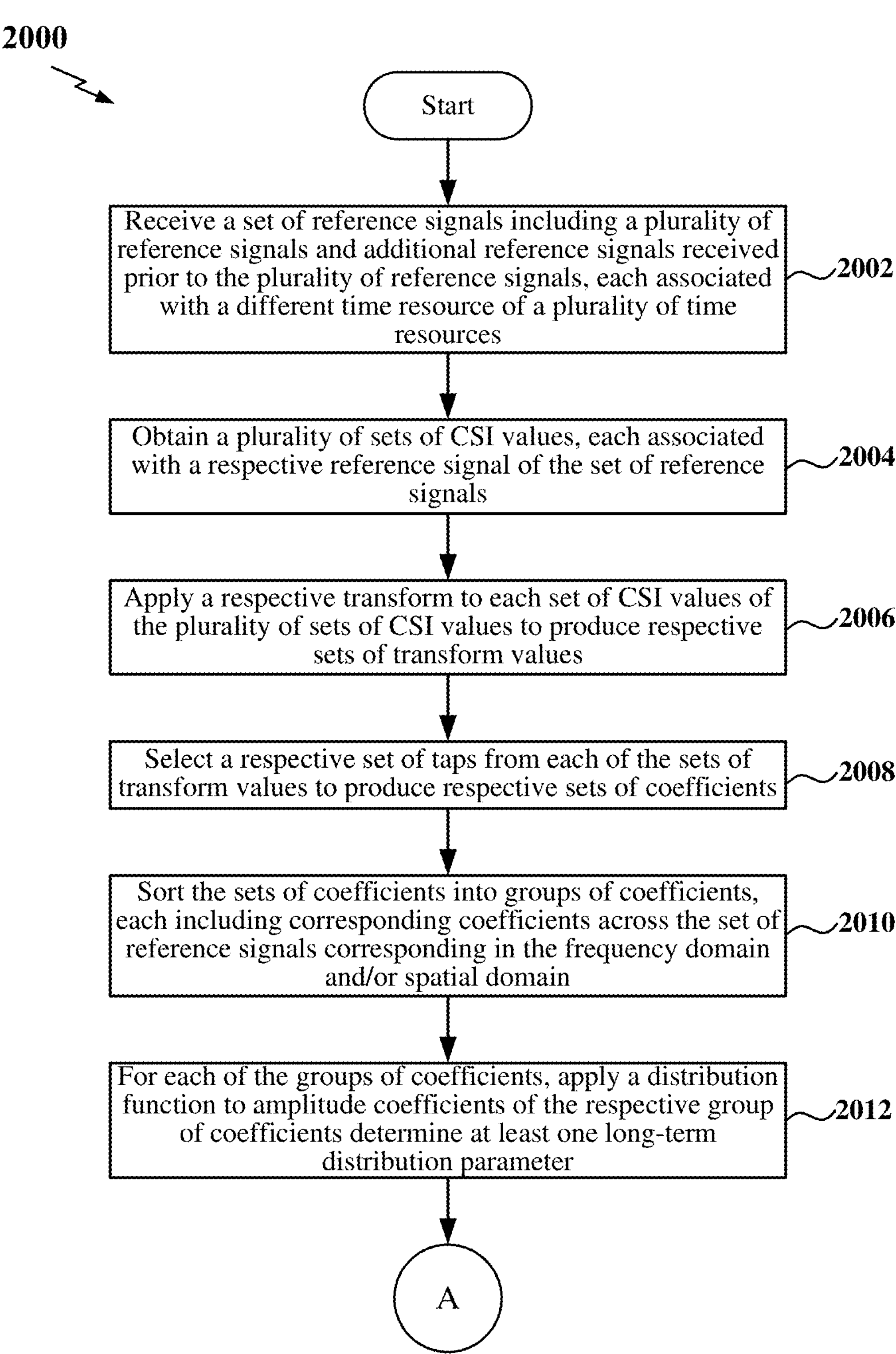
FIGS. 20-21 illustrate a flow chart of another exemplary method for transmitting time domain channel information within a CSI report according to some aspects.
Figure 21:
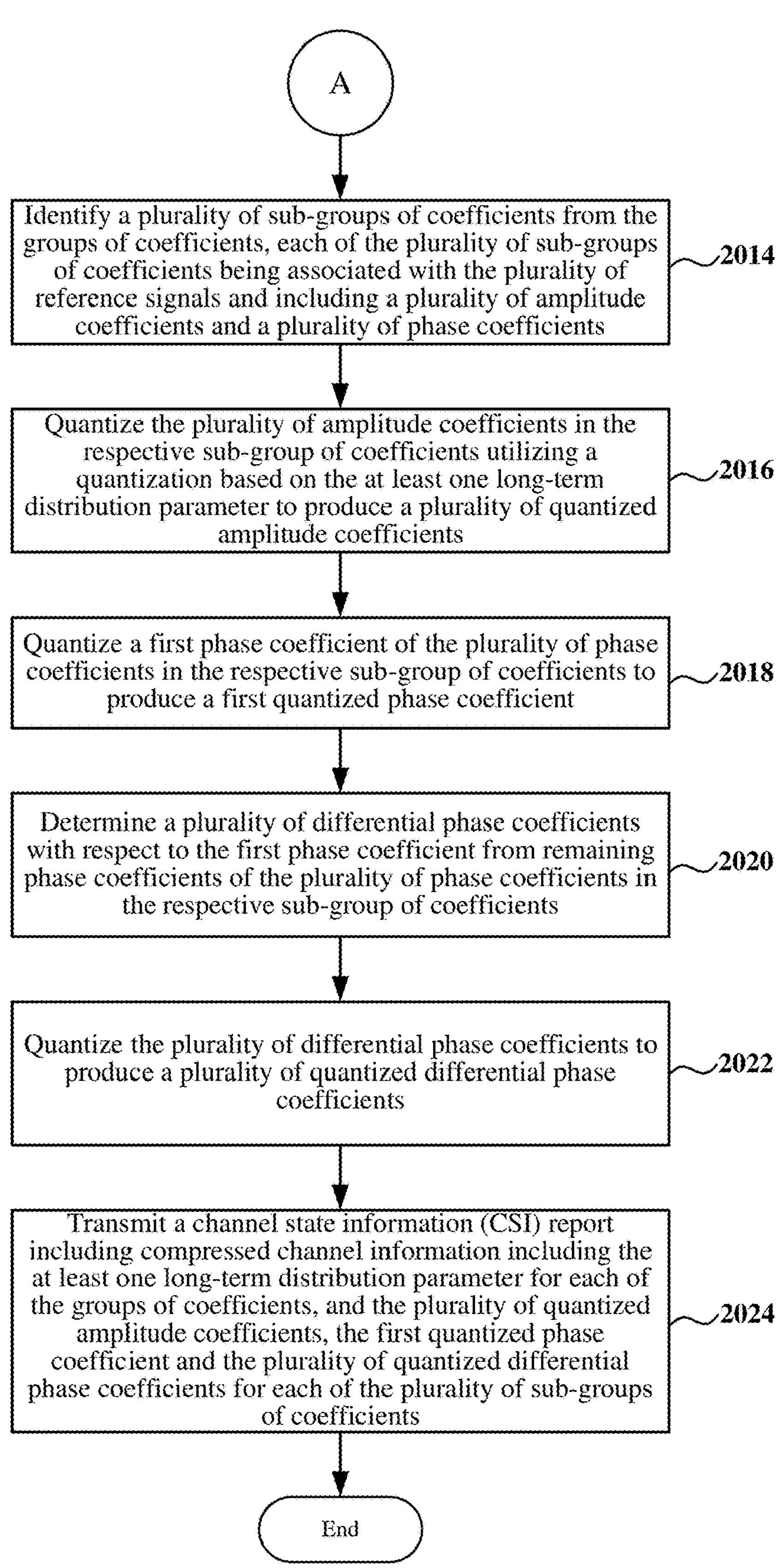

FIGS. 20-21 illustrate another example of a method 2000 for transmitting time domain channel information within a CSI report according to some aspects. As described below, some or all illustrated features may be omitted in a particular implementation within the scope of the present disclosure, and some illustrated features may not be required for implementation of all embodiments. In some examples, the method may be performed by the UE 1500, as described above and illustrated in FIG. 15, by a processor or processing system, or by any suitable means for carrying out the described functions.

At block 2002, the UE may receive a set of reference signals including a plurality of reference signals and additional reference signals received prior to the plurality of reference signals, each associated with a different time resource of a plurality of time resources. For example, the communication and processing circuitry 1542 and transceiver 1510 shown and described above in connection with FIG. 15 may provide a means to receive the set of reference signals.

At block 2004, the UE may obtain a plurality of sets of CSI values, each associated with a respective reference signal of the set of reference signals. For example, each set of CSI values may include one or more CSI values in each of a plurality of CSI types (e.g., RI, PMI, CQI, and LI). In some examples, the sets of CSI values may include multiple CSI values in the frequency domain and/or spatial domain. For example, the time domain channel information generation circuitry 1544 shown and described above in connection with FIG. 15 may provide a means to obtain the plurality of sets of CSI values.

At block 2006, the UE may apply a respective transform to each set of CSI values of the plurality of sets of CSI values to produce respective sets of transform values. For example, the time domain transform may be a DFT or DCT. For example, the time domain channel information generation circuitry 1544 shown and described above in connection with FIG. 15 may provide a means to apply a respective transform to each set of CSI values.

At block 2008, the UE may select a respective set of taps from each of the sets of transform values to produce respective sets of coefficients. In some examples, the number of taps may be pre-configured on the UE or configured by the base station. For example, the time domain channel information generation circuitry 1544 shown and described above in connection with FIG. 15 may provide a means to select the plurality of taps.

At block 2010, the UE may sort the sets of coefficients into groups of coefficients, each including corresponding coefficients across the set of reference signals corresponding in the frequency domain and/or spatial domain. For example, the time domain channel information generation circuitry 1544 shown and described above in connection with FIG. 15 may provide a means to sort the sets of coefficients into groups of coefficients.

At block 2012, the UE may, for each of the groups of coefficients, apply a distribution function to determine at least one long-term distribution parameter. The distribution function may include, for example, a PDF or CDF. In some examples, the UE may further, for each group of coefficients, determine respective long-term differential coefficients, and apply an additional distribution function to the respective long-term differential coefficients to determine at least one long-term differential distribution parameter. For example, the time domain channel information generation circuitry 1544 shown and described above in connection with FIG. 15 may provide a means to apply a respective distribution function to each group of coefficients to produce respective long-term distribution parameters.

At block 2014, the UE may identify a plurality of sub-groups of coefficients from the groups of coefficients, each of the plurality of sub-groups of coefficients being associated with the plurality of reference signals and including a plurality of amplitude coefficients and a plurality of phase coefficients. For example, the time domain channel information generation circuitry 1544 shown and described above in connection with FIG. 15 may provide a means to identify the plurality of sub-groups of coefficients (e.g., the short-term coefficients).

At block 2016, the UE may quantize the plurality of amplitude coefficients in the respective sub-group of coefficients utilizing a quantization based on the at least one long-term distribution parameter to produce a plurality of quantized amplitude coefficients. For example, the time domain channel information generation circuitry 1544 shown and described above in connection with FIG. 15 may provide a means to quantize the plurality of amplitude coefficients.

At block 2018, the UE may quantize a first phase coefficient of the plurality of phase coefficients in the respective sub-group of coefficients to produce a first quantized phase coefficient. For example, the time domain channel information generation circuitry 1544 shown and described above in connection with FIG. 15 may provide a means to quantize the first phase coefficient.

At block 2020, the UE may determine a plurality of differential phase coefficients with respect to the first phase coefficient from remaining phase coefficients of the plurality of phase coefficients in the respective sub-group of coefficients. For example, the time domain channel information generation circuitry 1544 shown and described above in connection with FIG. 15 may provide a means to determine the plurality of differential phase coefficients.

At block 2022, the UE may quantize the plurality of differential phase coefficients to produce a plurality of quantized differential phase coefficients. In some examples, the UE may utilize a different quantization type for the first phase coefficient and the plurality of differential phase coefficients. For example, the UE may use Q1 type quantization for the first phase coefficient and Q2 type quantization for each of the plurality of differential phase coefficients. For example, the time domain channel information generation circuitry 1544 shown and described above in connection with FIG. 15 may provide a means to quantize the plurality of differential phase coefficients.

At block 2024, the UE may transmit a channel state information (CSI) report including compressed channel information including the at least one long-term distribution parameter for each of the groups of coefficients, and the plurality of quantized amplitude coefficients, the first quantized phase coefficient and the plurality of quantized differential phase coefficients for each of the plurality of sub-groups of coefficients. For example, the communication and processing circuitry 1542, together with the CSI report generation circuitry 1546 and transceiver 1510, shown and described above in connection with FIG. 15 may provide a means to transmit the CSI report to the base station.

In one configuration, the UE 1500 includes means for performing the various functions and processes described in relation to FIG. 17. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 4-6, and/or 8-13, and utilizing, for example, the processes and/or algorithms described herein in relation to FIGS. 17-21.

Figure 22:
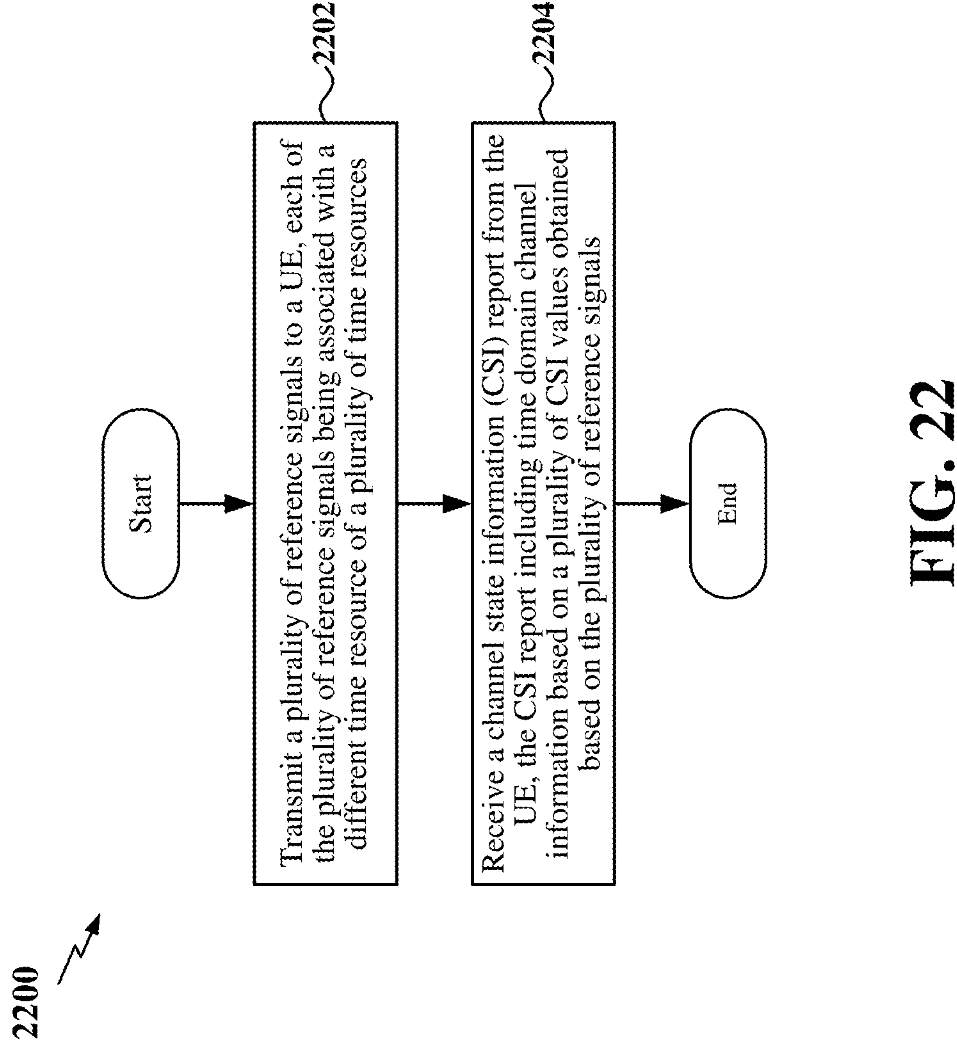
FIG. 22 is a flow chart of an exemplary method for receiving time domain channel information within a CSI report according to some aspects.

FIG. 22 is a flow chart illustrating an exemplary method 2200 for receiving time domain channel information within a CSI report according to some aspects. As described below, some or all illustrated features may be omitted in a particular implementation within the scope of the present disclosure, and some illustrated features may not be required for implementation of all embodiments. In some examples, the method may be performed by the base station 1600, as described above and illustrated in FIG. 16, by a processor or processing system, or by any suitable means for carrying out the described functions.

At block 2202, the base station may transmit a plurality of reference signals to a UE, each of the plurality of reference signals being associated with a different time resource of a plurality of time resources. In some examples, the reference signals may be CSI-RSs. For example, the communication and processing circuitry 1644, together with the transceiver 1610, shown and described above in connection with FIG. 16 may provide a means to transmit the reference signals.

At block 2204, the base station may receive a channel state information (CSI) report from the UE. The CSI report includes time domain channel information based on a plurality of CSI values obtained based on the plurality of reference signals. In some examples, the time domain channel information includes the plurality of CSI values. In other examples, the plurality of CSI values includes a respective set of CSI values for each of a plurality of CSI types. In some examples, the plurality of CSI types includes a channel state information reference signal (CSI-RS) resource indicator (CRI), a rank indicator, a layer indicator (LI), a precoding matrix indicator (PMI), and a channel quality indicator (CQI). In this example, the time domain channel information is arranged in the CSI report in an order corresponding to the CRI, the RI, the LI, zero padding, the PMI, and the CQI. In some examples, the time domain channel information includes a respective first entry for each of the plurality of CSI types and respective differential entries with respect to the respective first entry for each of the plurality of CSI types.

In some examples, the time domain channel information includes compressed channel information based on the plurality of CSI values. The base station may then reconstruct the plurality of CSI values based on the compressed channel information and schedule at least one downlink data transmission to the UE based on the plurality of CSI values. For example, the compressed channel information may include a main quantized phase coefficient, quantized differential phase coefficients, and at least one long-term amplitude parameter based on a number of CSI values including the plurality of CSI values and additional CSI values obtained prior to the plurality of CSI values.

As another example, the compressed channel information may include a first quantized phase coefficient, quantized differential phase coefficients that are differential with respect to the first quantized phase coefficient, at least one long-term distribution parameter of a distribution function applied to a plurality of long-term amplitude coefficients obtained from a set of reference signals including the plurality of reference signals and additional reference signals transmitted prior to the plurality of reference signals, and a plurality of quantized short-term amplitude coefficients associated with the plurality of reference signals that are quantized based on the at least one long-term distribution parameter. In some examples, the compressed channel information may further include at least one long-term differential distribution parameter of an additional distribution function applied to long-term differential amplitude coefficients obtained from the plurality of long-term amplitude coefficients, and the plurality of quantized short-term amplitude coefficients may include a first quantized short-term amplitude coefficient quantized based on the at least one long-term distribution parameter and a plurality of quantized differential coefficients that are differential with respect to the first quantized coefficient and quantized based on the at least one long-term differential distribution parameter. For example, the communication and processing circuitry 1644, together with the CSI report processing circuitry 1646 and transceiver 1610, shown and described above in connection with FIG. 16 may provide a means to receive the CSI report.

In one configuration, the base station 1600 includes means for performing the various functions and processes described in relation to FIG. 22. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4-6, 8 and/or 9, and utilizing, for example, the processes and/or algorithms described herein in relation to FIG. 22.

The processes shown in FIGS. 17-32 may include additional aspects, such as any single aspect or any combination of aspects described below and/or in connection with one or more other processes described elsewhere herein.

Aspect 1: A method for wireless communication at a user equipment (UE), the method comprising: receiving a plurality of reference signals, each associated with a different time resource of a plurality of time resources; and transmitting a channel state information (CSI) report comprising time domain channel information based on a plurality of CSI values obtained based on the plurality of reference signals.

Aspect 2: The method of aspect 1, wherein the time domain channel information comprises the plurality of CSI values.

Aspect 3: The method of aspect 1, wherein the time domain channel information comprises compressed channel information based on the plurality of CSI values.

Aspect 4: The method of aspect 3, further comprising: applying a time domain transform to the plurality of CSI values to produce a plurality of transform values; selecting a plurality of taps from the plurality of transform values to produce a plurality of coefficients; and quantizing the plurality of coefficients to produce a plurality of quantized time domain coefficients, wherein the compressed channel information comprises the plurality of quantized time domain coefficients and respective indices of each of the plurality of taps.

Aspect 5: The method of aspect 4, further comprising: applying at least one of a spatial domain transform or a frequency domain transform to the plurality of quantized time domain coefficients to produce additional quantized coefficients, wherein the compressed channel information further comprises the additional quantized coefficients.

Aspect 6: The method of aspect 4, further comprising: applying at least one of a spatial domain transform or a frequency domain transform prior to the time domain transform to produce additional quantized coefficients, wherein the compressed channel information further comprises the additional quantized coefficients.

Aspect 7: The method of any of aspects 4 through 6, wherein the plurality of CSI values comprise a respective set of CSI values for each sub-band of a plurality of sub-bands, and wherein the applying the time domain transform further comprises: applying the time domain transform to each of the respective sets of CSI values.

Aspect 8: The method of aspect 7, wherein the applying the time domain transform further comprises: applying a different time domain transform to at least two of the respective sets of CSI values.

Aspect 9: The method of any of aspects 4 through 8, wherein the plurality of coefficients comprises a main phase coefficient and a plurality of differential phase coefficients with respect to the main phase coefficient.

Aspect 10: The method of aspect 9, further comprising: determining at least one long-term amplitude parameter from a number of CSI values including the plurality of CSI values and additional CSI values obtained prior to the plurality of CSI values, wherein the time domain channel information further comprises the at least one long-term amplitude parameter.

Aspect 11: The method of aspect 9 or 10, wherein the quantizing the plurality of coefficients to produce the plurality of quantized time domain coefficients further comprises: quantizing the main phase coefficient using a first quantization type to produce a main quantized phase coefficient; and quantizing the plurality of differential phase coefficients using a second quantization type to produce a plurality of quantized differential phase coefficients, wherein the compressed channel information comprises the main quantized phase coefficient and the quantized differential phase coefficients.

Aspect 12: The method of aspect 11, wherein the first quantization type is different than the second quantization type.

Aspect 13: The method of any of aspects 3 through 8, further comprising: obtaining a plurality of sets of CSI values, each associated with a respective reference signal of a set of reference signals including the plurality of reference signals and additional reference signals received prior to the plurality of reference signals; applying a respective transform to each set of CSI values of the plurality of sets of CSI values to produce respective sets of transform values; selecting a respective set of taps from each of the sets of transform values to produce respective sets of coefficients; sorting the sets of coefficients into groups of coefficients, wherein each group of coefficients comprises corresponding coefficients across the set of reference signals, wherein the corresponding coefficients are corresponding in one of a frequency domain or spatial domain; and for each of the groups of coefficients, applying a distribution function to amplitude coefficients of the respective group of coefficients to determine at least one long-term distribution parameter, wherein the compressed channel information comprises the at least one long-term distribution parameter for each of the groups of coefficients.

Aspect 14: The method of aspect 13, further comprising: identifying a plurality of sub-groups of coefficients from the groups of coefficients, each of the plurality of sub-groups of coefficients being associated with the plurality of reference signals; for each of the plurality of sub-groups of coefficients including both a plurality of amplitude coefficients and a plurality of phase coefficients: quantizing the plurality of amplitude coefficients in the respective sub-group of coefficients utilizing a quantization based on the at least one long-term distribution parameter to produce a plurality of quantized amplitude coefficients; quantizing a first phase coefficient of the plurality of phase coefficients in the respective sub-group of coefficients to produce a first quantized phase coefficient; determining a plurality of differential phase coefficients with respect to the first phase coefficient from remaining phase coefficients of the plurality of phase coefficients in the respective sub-group of coefficients; and quantizing the plurality of differential phase coefficients to produce a plurality of quantized differential phase coefficients, wherein the compressed channel information comprises the plurality of quantized amplitude coefficients, the first quantized phase coefficient and the plurality of quantized differential phase coefficients for each of the plurality of sub-groups of coefficients.

Aspect 15: The method of aspect 14 further comprising: for each of the groups of coefficients, determining respective long-term differential coefficients; and applying an additional distribution function to the respective long-term differential coefficients to determine at least one long-term differential distribution parameter, wherein the compressed channel information further comprises the at least one long-term differential distribution parameter.

Aspect 16: The method of claim 15, wherein the quantizing the plurality of amplitude coefficients in the respective sub-group of coefficients further comprises: quantizing a first amplitude coefficient of the plurality of amplitude coefficients in the respective sub-group of coefficients utilizing the quantization based on the at least one long-term distribution parameter to produce a first quantized amplitude coefficient; determining a plurality of differential amplitude coefficients with respect to the first amplitude coefficient based on remaining amplitude coefficients of the plurality of amplitude coefficients in the respective sub-group of coefficients to produce a plurality of differential amplitude coefficients; and quantizing the differential amplitude coefficients utilizing an additional quantization based on the at least one long-term differential distribution parameter to produce a plurality of quantized differential amplitude coefficients, wherein the compressed channel information further comprises the first quantized amplitude coefficient and the plurality of quantized differential amplitude coefficients.

Aspect 17: The method of any of aspects 1 through 16, wherein the plurality of CSI values comprise a respective set of CSI values for each of a plurality of CSI types including a channel state information reference signal (CSI-RS) resource indicator (CRI), a rank indicator, a layer indicator (LI), a precoding matrix indicator (PMI), and a channel quality indicator (CQI), and wherein the time domain channel information is arranged in the CSI report in an order corresponding to the CRI, the RI, the LI, zero padding, the PMI, and the CQI.

Aspect 18: The method of aspect 17, wherein the time domain channel information comprises a respective first entry for each of the plurality of CSI types and respective differential entries with respect to the respective first entry for each of the plurality of CSI types.

Aspect 19: A user equipment (UE) configured for wireless communication comprising a transceiver, a memory, and a processor coupled to the transceiver and the memory, the processor and the memory configured to perform a method of any one of aspects 1 through 18.

Aspect 20: A user equipment (UE) configured for wireless communication comprising means for performing a method of any one of aspects 1 through 18.

Aspect 21: A non-transitory computer-readable medium having stored therein instructions executable by one or more processors of a user equipment (UE) configured for wireless communication to perform a method of any one of aspects 1 through 18.

Aspect 22: A method for wireless communication at a base station, the method comprising: transmitting a plurality of reference signals to a user equipment (UE), each of the plurality of reference signals being associated with a different time resource of a plurality of time resources; and receiving a channel state information (CSI) report from the UE, the CSI report comprising time domain channel information based on a plurality of CSI values obtained based on the plurality of reference signals.

Aspect 23: The method of aspect 22, wherein the time domain channel information comprises the plurality of CSI values.

Aspect 24: The method of aspect 23, wherein the plurality of CSI values comprise a respective set of CSI values for each of a plurality of CSI types, wherein the plurality of CSI types comprises a channel state information reference signal (CSI-RS) resource indicator (CRI), a rank indicator, a layer indicator (LI), a precoding matrix indicator (PMI), and a channel quality indicator (CQI), and wherein the time domain channel information is arranged in the CSI report in an order corresponding to the CRI, the RI, the LI, zero padding, the PMI, and the CQI.

Aspect 25: The method of aspect 24, wherein the time domain channel information comprises a respective first entry for each of the plurality of CSI types and respective differential entries with respect to the respective first entry for each of the plurality of CSI types.

Aspect 26: The method of aspect 22, wherein the time domain channel information comprises compressed channel information based on the plurality of CSI values, and further comprising: reconstructing the plurality of CSI values based on the compressed channel information.

Aspect 27: The method of aspect 26, wherein the compressed channel information comprises a main quantized phase coefficient, quantized differential phase coefficients, and at least one long-term amplitude parameter based on a number of CSI values including the plurality of CSI values and additional CSI values obtained prior to the plurality of CSI values.

Aspect 28: The method of aspect 26, wherein the compressed channel information comprises a first quantized phase coefficient, quantized differential phase coefficients that are differential with respect to the first quantized phase coefficient, at least one long-term distribution parameter of a distribution function applied to a plurality of long-term amplitude coefficients obtained from a set of reference signals including the plurality of reference signals and additional reference signals transmitted prior to the plurality of reference signals, and a plurality of quantized short-term amplitude coefficients associated with the plurality of reference signals that are quantized based on the at least one long-term distribution parameter.

Aspect 29: The method of aspect 28, wherein: the compressed channel information further comprises at least one long-term differential distribution parameter of an additional distribution function applied to long-term differential amplitude coefficients obtained from the plurality of long-term amplitude coefficients, and the plurality of quantized short-term amplitude coefficients comprise a first quantized short-term amplitude coefficient quantized based on the at least one long-term distribution parameter and a plurality of quantized differential coefficients that are differential with respect to the first quantized coefficient and quantized based on the at least one long-term differential distribution parameter.

Aspect 30: A base station configured for wireless communication comprising a transceiver, a memory, and a processor coupled to the transceiver and the memory, the processor and the memory configured to perform a method of any one of aspects 22 through 29.

Aspect 31: A base station configured for wireless communication comprising means for performing a method of any one of aspects 22 through 29.

Aspect 32: A non-transitory computer-readable medium having stored therein instructions executable by one or more processors of a base station configured for wireless communication to perform a method of any one of aspects 22 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, 8-13, 15, and/or 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) configured for wireless communication, comprising:

a transceiver;

a memory; and a processor coupled to the transceiver and the memory, wherein the processor and the memory are configured to:

receive a plurality of reference signals, each associated with a different time resource of a plurality of time resources;

transmit a channel state information (CSI) report comprising time domain channel information based on a plurality of CSI values obtained based on the plurality of reference signals, wherein the time domain channel information comprises compressed channel information based on the plurality of CSI values;

determine a long-term amplitude parameter from a number of CSI values including the plurality of CSI values and additional CSI values obtained prior to the plurality of CSI values, wherein the long-term amplitude parameter includes an average of the amplitudes of the number of CSI values, wherein the time domain channel information further comprises the at least one long-term amplitude parameter;

apply a time domain transform to the plurality of CSI values to produce a plurality of transform values;

select a plurality of taps from the plurality of transform values to produce a plurality of coefficients, wherein the plurality of coefficients comprises a main phase coefficient and a plurality of differential phase coefficients with respect to the main phase coefficient; and quantize the main phase coefficient using a first quantization type to produce a main quantized phase coefficient and quantize the plurality of differential phase coefficients using a second quantization type to produce a plurality of quantized differential phase coefficients, wherein the compressed channel information comprises the main quantized phase coefficient and the quantized differential phase coefficients, wherein the first quantization type is different from the second quantization type and wherein the compressed channel information comprises respective indices of each of the plurality of taps.

2. The UE of claim 1, wherein the time domain channel information comprises the plurality of CSI values.

3. The UE of claim 1, wherein the processor and the memory are further configured to:

apply at least one of a spatial domain transform or a frequency domain transform to the plurality of quantized time domain coefficients to produce additional quantized coefficients, wherein the compressed channel information further comprises the additional quantized coefficients.

4. The UE of claim 1, wherein the processor and the memory are further configured to:

apply at least one of a spatial domain transform or a frequency domain transform prior to the time domain transform to produce additional quantized coefficients, wherein the compressed channel information further comprises the additional quantized coefficients.

5. The UE of claim 1, wherein the plurality of CSI values comprise a respective set of CSI values for each sub-band of a plurality of sub-bands, and wherein the processor and the memory are further configured to:

apply the time domain transform to each of the respective sets of CSI values.

6. The UE of claim 5, wherein the processor and the memory are further configured to:

apply a different time domain transform to at least two of the respective sets of CSI values.

7. The UE of claim 1, wherein the plurality of CSI values comprise a respective set of CSI values for each of a plurality of CSI types including a channel state information reference signal (CSI-RS) resource indicator (CRI), a rank indicator (RI), a layer indicator (LI), a precoding matrix indicator (PMI), and a channel quality indicator (CQI), and wherein the time domain channel information is arranged in the CSI report in an order corresponding to the CRI, the RI, the LI, zero padding, the PMI, and the CQI.

8. The UE of claim 7, wherein the time domain channel information comprises a respective first entry for each of the plurality of CSI types and respective differential entries with respect to the respective first entry for each of the plurality of CSI types.

9. A base station configured for wireless communication, comprising:

a transceiver;

a memory; and a processor coupled to the transceiver and the memory, wherein the processor and the memory are configured to:

transmit a plurality of reference signals to a user equipment (UE), each of the plurality of reference signals being associated with a different time resource of a plurality of time resources;

receive a channel state information (CSI) report from the UE, the CSI report comprising time domain channel information based on a plurality of CSI values obtained based on the plurality of reference signals, wherein the time domain channel information comprises compressed channel information based on the plurality of CSI values, and wherein the compressed channel information comprises a main quantized phase coefficient, quantized differential phase coefficients, and at least one long-term amplitude parameter based on a number of CSI values including the plurality of CSI values and additional CSI values obtained prior to the plurality of CSI values, wherein the long-term amplitude parameter includes an average of the amplitudes of the number of CSI values; and reconstruct the plurality of CSI values based on the compressed channel information.

10. The base station of claim 9, wherein the time domain channel information comprises the plurality of CSI values.

11. The base station of claim 10, wherein the plurality of CSI values comprise a respective set of CSI values for each of a plurality of CSI types, wherein the plurality of CSI types comprises a channel state information reference signal (CSI-RS) resource indicator (CRI), a rank indicator (RI), a layer indicator (LI), a precoding matrix indicator (PMI), and a channel quality indicator (CQI), and wherein the time domain channel information is arranged in the CSI report in an order corresponding to the CRI, the RI, the LI, zero padding, the PMI, and the CQI.

12. The base station of claim 11, wherein the time domain channel information comprises a respective first entry for each of the plurality of CSI types and respective differential entries with respect to the respective first entry for each of the plurality of CSI types.

13. The base station of claim 9, wherein the compressed channel information comprises a first quantized phase coefficient, quantized differential phase coefficients that are differential with respect to the first quantized phase coefficient, at least one long-term distribution parameter of a distribution function applied to a plurality of long-term amplitude coefficients obtained from a set of reference signals including the plurality of reference signals and additional reference signals transmitted prior to the plurality of reference signals, and a plurality of quantized short-term amplitude coefficients associated with the plurality of reference signals that are quantized based on the at least one long-term distribution parameter.

14. The base station of claim 13, wherein:

the compressed channel information further comprises at least one long-term differential distribution parameter of an additional distribution function applied to long-term differential amplitude coefficients obtained from the plurality of long-term amplitude coefficients, and the plurality of quantized short-term amplitude coefficients comprise a first quantized short-term amplitude coefficient quantized based on the at least one long-term distribution parameter and a plurality of quantized differential coefficients that are differential with respect to the first quantized coefficient and quantized based on the at least one long-term differential distribution parameter.

15. A method for wireless communication at a user equipment (UE), the method comprising:

receiving a plurality of reference signals, each associated with a different time resource of a plurality of time resources;

transmitting a channel state information (CSI) report comprising time domain channel information based on a plurality of CSI values obtained based on the plurality of reference signals, wherein the time domain channel information comprises compressed channel information based on the plurality of CSI values;

determining at least one long-term amplitude parameter from a number of CSI values including the plurality of CSI values and additional CSI values obtained prior to the plurality of CSI values, wherein the time domain channel information further comprises the at least one long-term amplitude parameter, wherein the long-term amplitude parameter includes an average of the amplitudes of the number of CSI values;

applying a time domain transform to the plurality of CSI values to produce a plurality of transform values;

selecting a plurality of taps from the plurality of transform values to produce a plurality of coefficients, wherein the plurality of coefficients comprises a main phase coefficient and a plurality of differential phase coefficients with respect to the main phase coefficient; and quantizing the main phase coefficient using a first quantization type to produce a main quantized phase coefficient and quantize the plurality of differential phase coefficients using a second quantization type to produce a plurality of quantized differential phase coefficients, wherein the compressed channel information comprises the main quantized phase coefficient and the quantized differential phase coefficients, wherein the first quantization type is different from the second quantization type and wherein the compressed channel information comprises respective indices of each of the plurality of taps.

16. The method of claim 15, wherein the time domain channel information comprises the plurality of CSI values.

17. A method for wireless communication at a base station, the method comprising:

transmitting a plurality of reference signals to a user equipment (UE), each of the plurality of reference signals being associated with a different time resource of a plurality of time resources;

receiving a channel state information (CSI) report from the UE, the CSI report comprising time domain channel information based on a plurality of CSI values obtained based on the plurality of reference signals, wherein the time domain channel information comprises compressed channel information based on the plurality of CSI values, and wherein the compressed channel information comprises a main quantized phase coefficient, quantized differential phase coefficients, and at least one long-term amplitude parameter based on a number of CSI values including the plurality of CSI values and additional CSI values obtained prior to the plurality of CSI values, wherein the long-term amplitude parameter includes an average of the amplitudes of the number of CSI values; and reconstructing the plurality of CSI values based on the compressed channel information.

* * * * *